US011108535B2

(12) United States Patent
Bader et al.

(10) Patent No.: US 11,108,535 B2
(45) Date of Patent: Aug. 31, 2021

(54) FULL-DUPLEX FORWARDING IN AUTONOMOUS COOPERATIVE ROUTING

(71) Applicant: KING ABDULLAH UNIVERSITY OF SCIENCE AND TECHNOLOGY, Thuwal (SA)

(72) Inventors: Ahmed Bader, Tla'a Al-Ali District (JO); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 62 days.

(21) Appl. No.: 16/610,963

(22) PCT Filed: May 17, 2018

(86) PCT No.: PCT/IB2018/053486
§ 371 (c)(1),
(2) Date: Nov. 5, 2019

(87) PCT Pub. No.: WO2018/229577
PCT Pub. Date: Dec. 20, 2018

(65) Prior Publication Data
US 2020/0106595 A1 Apr. 2, 2020

Related U.S. Application Data

(60) Provisional application No. 62/518,193, filed on Jun. 12, 2017.

(51) Int. Cl.
*H04L 5/16* (2006.01)
*H04L 12/733* (2013.01)
(Continued)

(52) U.S. Cl.
CPC ............. *H04L 5/16* (2013.01); *H04L 45/20* (2013.01); *H04W 40/20* (2013.01); *H04W 72/0453* (2013.01); *H04W 84/18* (2013.01)

(58) Field of Classification Search
None
See application file for complete search history.

(56) References Cited

U.S. PATENT DOCUMENTS

| 9,743,429 | B2* | 8/2017 | Bader | H04L 5/0035 |
| 2009/0029645 | A1* | 1/2009 | Leroudier | H04W 84/047 |
| | | | | 455/7 |

(Continued)

OTHER PUBLICATIONS

Bader, A. et al., "An Efficient Multi-Carrier Position-Based Packet Forwarding Protocol for Wireless Sensor Networks," IEEE Transactions on Wireless Communications, Jan. 2012, vol. 11, No. 1, pp. 305-315.

(Continued)

*Primary Examiner* — Kenny S Lin
(74) *Attorney, Agent, or Firm* — Patent Portfolio Builders PLLC

(57) ABSTRACT

A full-duplex autonomous cooperative routing in an ad hoc network is described. A central station transmits a broadcast packet to a plurality of additional communication nodes in the ad hoc network over a half-duplex frequency channel. The broadcast packet allows other communication nodes to autonomously compute frequency channel assignments for forwarding a packet during a full-duplex data transmission. A source communication node transmits the packet on a full-duplex frequency channel over the ad hoc network towards a sink communication node during the full-duplex data transmission after a frequency channel has been assigned for the full-duplex data transmission.

16 Claims, 22 Drawing Sheets

Centralized Resource Allocation

(51) Int. Cl.
  *H04W 40/20*   (2009.01)
  *H04W 72/04*   (2009.01)
  *H04W 84/18*   (2009.01)

(56) References Cited

U.S. PATENT DOCUMENTS

2013/0089011 A1   4/2013   Alapuranen
2014/0206368 A1*  7/2014   Maltsev ............ H04W 72/0406
                                                     455/450
2019/0014526 A1   1/2019   Bader et al.
2019/0288897 A1*  9/2019   Bui Do .............. H04W 52/367

OTHER PUBLICATIONS

Bader, A. et al., "Mobile Ad Hoc Networks in Bandwidth-Demanding Mission-Critical Applications: Practical Implementation Insights," IEEE Access, Mar. 8, 2017, vol. 5, pp. 891-910.
International Search Report in corresponding/related International Application No. PCT/IB2018/053486, dated Aug. 31, 2018.
Sabharwal, A. et al., "In-Band Full-Duplex Wireless: Challenges and Opportunities," IEEE Journal on Selected Areas in Communications, Jun. 12, 2014, vol. 32, Issue 9, pp. 1637-1652.
Written Opinion of International Searching Authority in corresponding/related International Application No. PCT/IB2018/053486, dated Aug. 31, 2018.

* cited by examiner

Centralized Resource Allocation

FULL-DUPLEX FORWARDING IN AUTONOMOUS COOPERATIVE ROUTING

CROSS-REFERENCE TO RELATED APPLICATIONS

This application is a U.S. National Stage Application of International Application No. PCT/IB2018/053486, filed on May 17, 2018, which claims priority and benefit from U.S. Provisional Application No. 62/518,193, filed Jun. 12, 2017, the entire contents of which are incorporated herein by reference.

TECHNICAL FIELD

The present disclosure is generally related to autonomous cooperate routing in mobile ad hoc networks.

BACKGROUND

Autonomous cooperative routing (ACR) is mainly catered towards mobile ad hoc networking applications. It allows each mobile node to take packet forwarding decisions on its own without reverting to any kind of cross-node coordination or information exchange. The state-of-the-art in ACR entails the use of half-duplex (HD) decode-and-forward (DF) packet forwarding.

Different types of autonomous cooperative routing are described in detail in the following references which are incorporated in their entireties herein by reference:
1. A. Bader, K. Abed-Meraim and M. S. Alouini, "An Efficient Multi-Carrier Position-Based Packet Forwarding Protocol for Wireless Sensor Networks," in IEEE Transactions on Wireless Communications, vol. 11, no. 1, pp. 305-315, January 2012.
2. A. Bader; M. S. Alouini, "Mobile Ad Hoc Networks in Bandwidth-Demanding Mission-Critical Applications: Practical Implementation Insights," IEEE Access, vol. 5, pp. 891-910, 2017.
3. "A High-Throughput Ultra-Low-Latency Ad Hoc Networking Scheme for Mobile Cyber-Physical Systems", U.S. Provisional patent 62/293,054.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
FIGS. 1-9 are diagrams illustrating a network of communication nodes performing a centralized resource allocation method in accordance with various embodiments of the present disclosure.
Figure 1:
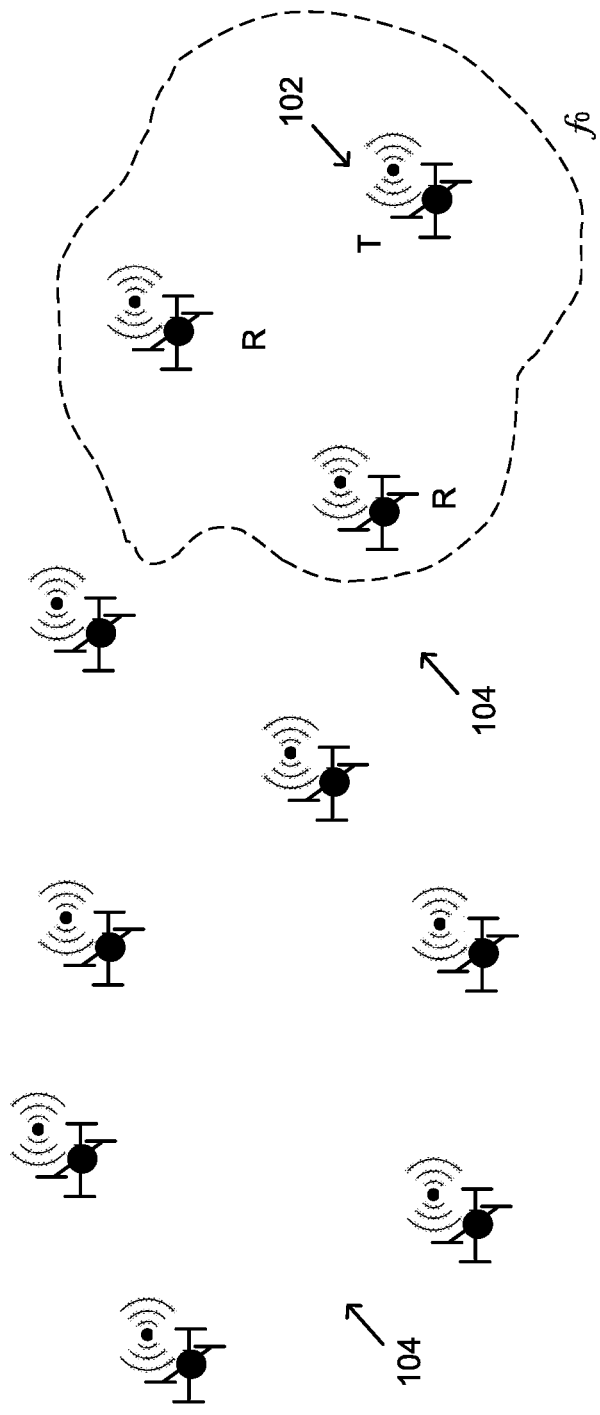

A subject of this disclosure is to introduce full-duplex functionality to autonomous cooperative routing (ACR). Within this context, this disclosure refers to out-of-band full-duplex in contrast to in-band full-duplex. Out-of-band full-duplex (FD) means that a transceiver receives and transmits two different packets concurrently but at two different frequency channels. In-band FD is not practically feasible yet in a mobile ad hoc networking context due to the excessive co-channel interference that wireless devices will have to deal with.

Indeed, aiming to couple ACR with FD functionality presents a unique set of challenges from the perspective of protocol design and protocol operation. At the forefront of such challenges is the issue of frequency assignment. This disclosure presents two methods/routines to handle frequency assignments. Both methods entail the use of half-duplex mode for a very short period of time (typically less than 2% of the time) to prepare the grounds for FD operations. The half-duplex phase is used to allocate resources, particularly frequency, for a data transmission phase that follows.

The operation of the presented methods is based on the assumption that each communication node in an ad hoc network has knowledge of its position with respect to the sink. For example, a network communication node may be an electronic device that is capable of creating, receiving, or transmitting information over a communications channel within the ad hoc network. It has been demonstrated in the three references above that the position need not be very accurate. Such geographical awareness is instrumental to ACR during data forwarding. In one embodiment, a node decides to forward or become part of the forwarding process if and only if it is closer to the destination than all previous hop transmitters or a subset thereof. Phrased differently, a node decides to forward if it offers positive progress towards the sink.

In the following, various methods or routines for enabling full-duplex data forwarding capability in ACR are described, including a centralized resource allocation method and an upstream network reservation method (having multiple implementations).

Centralized Resource Allocation

An exemplary embodiment of the centralized resource allocation method in accordance with the present disclosure features a time-division duplexing (TDD) cycle, where upstream transmission is separated from downstream transmission by the allocation of different time slots. Accordingly, a first phase of the TDD cycle is a downstream broadcast originating from the sink node towards all network communication nodes.

The purpose of the downstream or downlink phase is to convey resource allocation parameters to all nodes within the network. This phase is typically allocated less than 2% of the time and is operated in half-duplex mode. Parameters communicated by a node fulfilling a role as a central station to the remaining nodes within the network include frequency assignments for the full-duplex phase, transmit power levels, as well as modulation and coding schemes (which are referred to as the transmission attributes). Frequency assignments are computed by the central station based on the relative positioning of communication nodes within the network. In this method, the downlink phase is executed using the most robust transmission attributes to maximize likelihood of delivery to all nodes within the network.

A second phase of the TDD cycle is dedicated for the full-duplex data transmissions and is allocated typically more than 98% of the time. The direction of data flow in this cycle is upstream, e.g. convergecast, from the mobile nodes towards the sink. An illustrative depiction of an exemplary embodiment of the centralized resource allocation method is shown in FIGS. 1-9 in accordance with the present disclosure.

In FIG. 1, the central station 102 uses robust transmission attributes, i.e. maximum transmit power level and lowest modulation and coding scheme (MCS), in order to maximize its reach with nodes 104 in an ad hoc network 100. In some embodiments, a former node 104 may be assigned the role of the central station 102. This step is generally preceded by an upstream broadcast transmission from each node 104 in the network 100 upon network initialization. The goal of such broadcasts is for nodes to convey their position attributes to the central station 102. Afterwards, the central station 102 transmits a broadcast packet to the nodes 104 with frequency assignments and transmission attributes for the full-duplex phase. In the figure, the nodes that are in the act of transmitting a packet are denoted with a T and the nodes that in the act of receiving a packet are denoted with an R.

Figure 2:
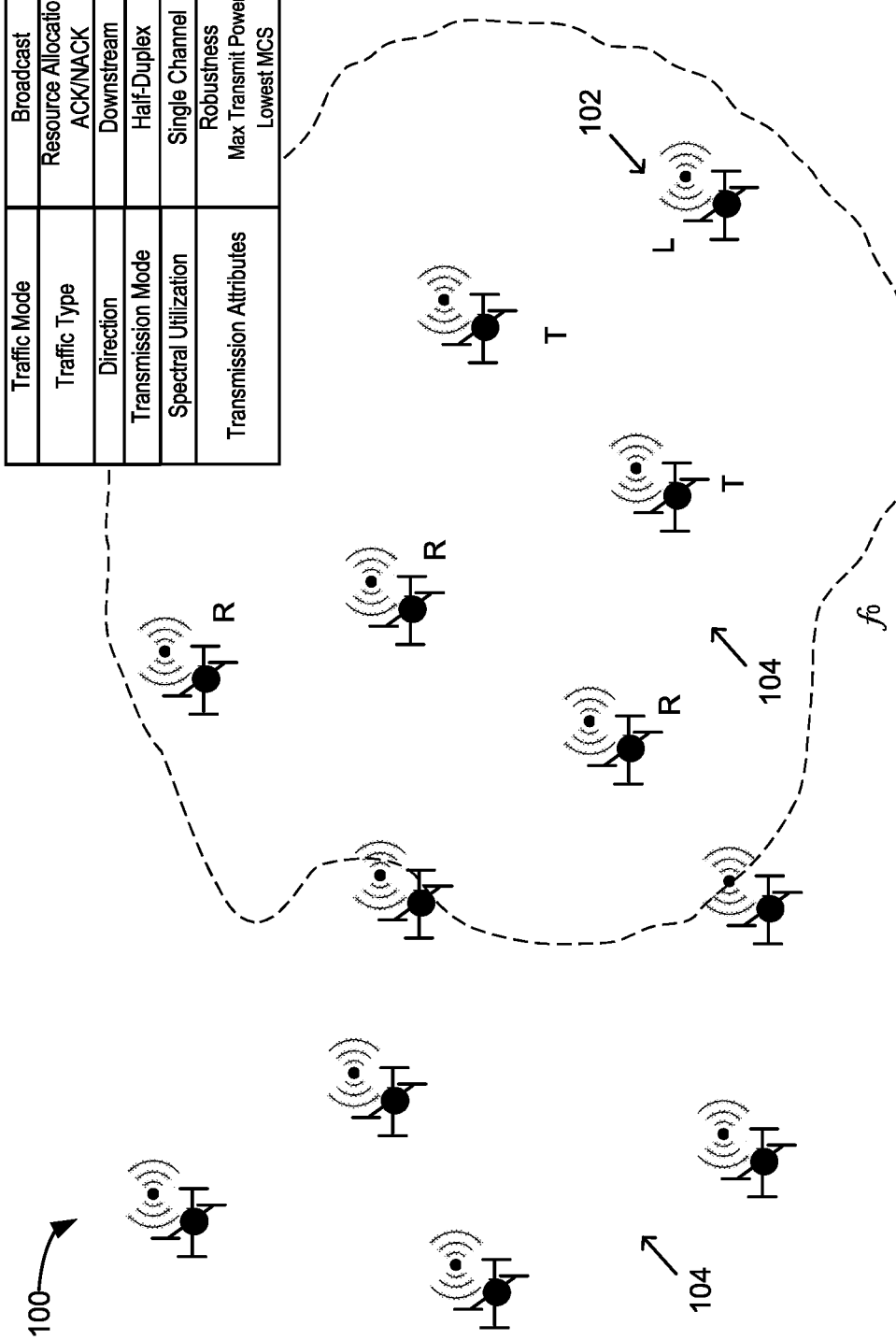

Next, in FIG. 2, after transmitting the broadcast packet on frequency channel $f_0$, the central station 102 transitions into a listen state (denoted by L) to confirm that the broadcast process continues ahead with neighboring nodes 104. Accordingly, the nodes that received the broadcast packet in the earlier figure are now denoted as transmitters T in the current figure. Robust transmission attributes are used throughout the whole broadcast downstream phase to ensure maximum reachability.

Figure 3:
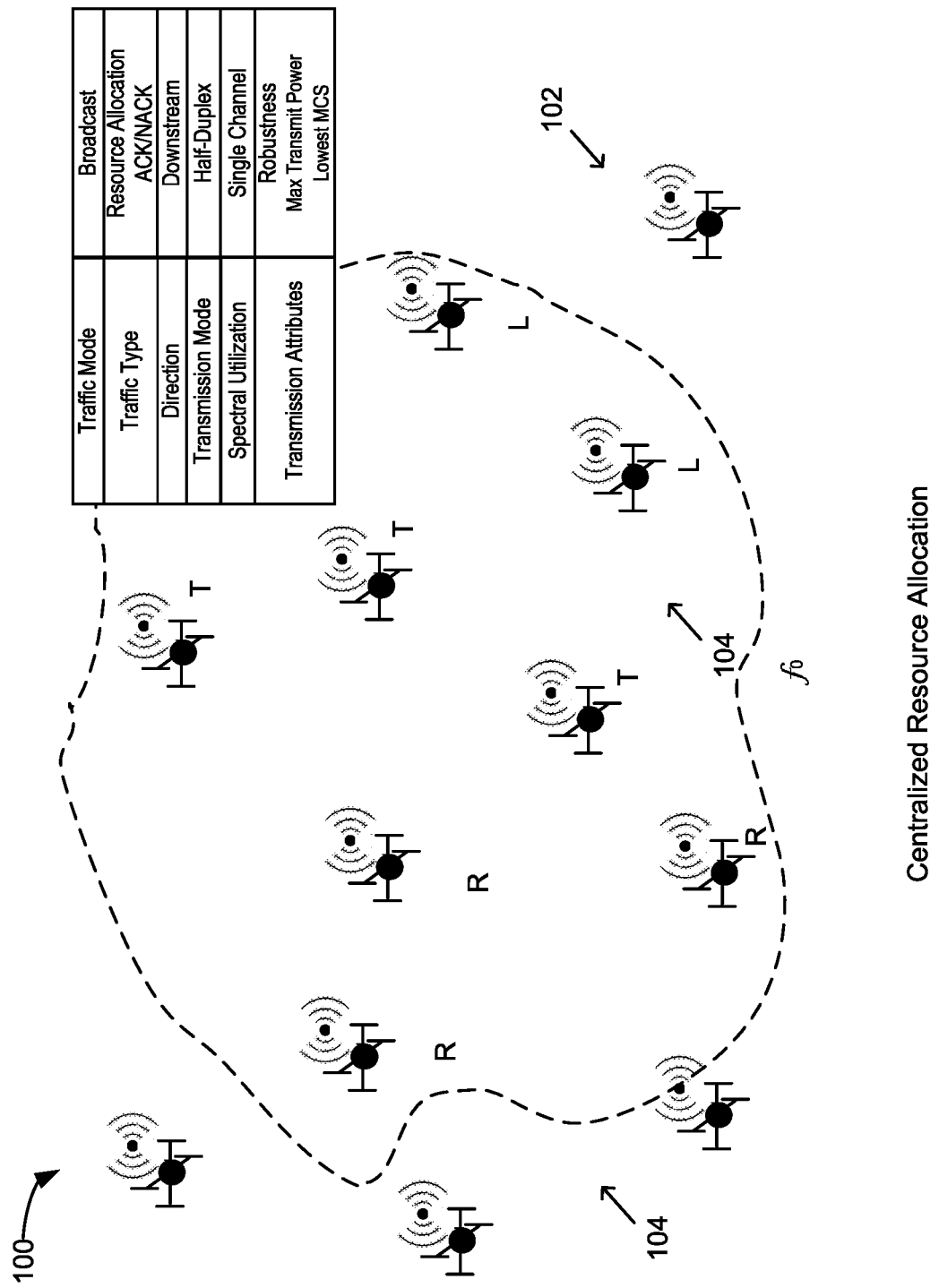
Figure 4:
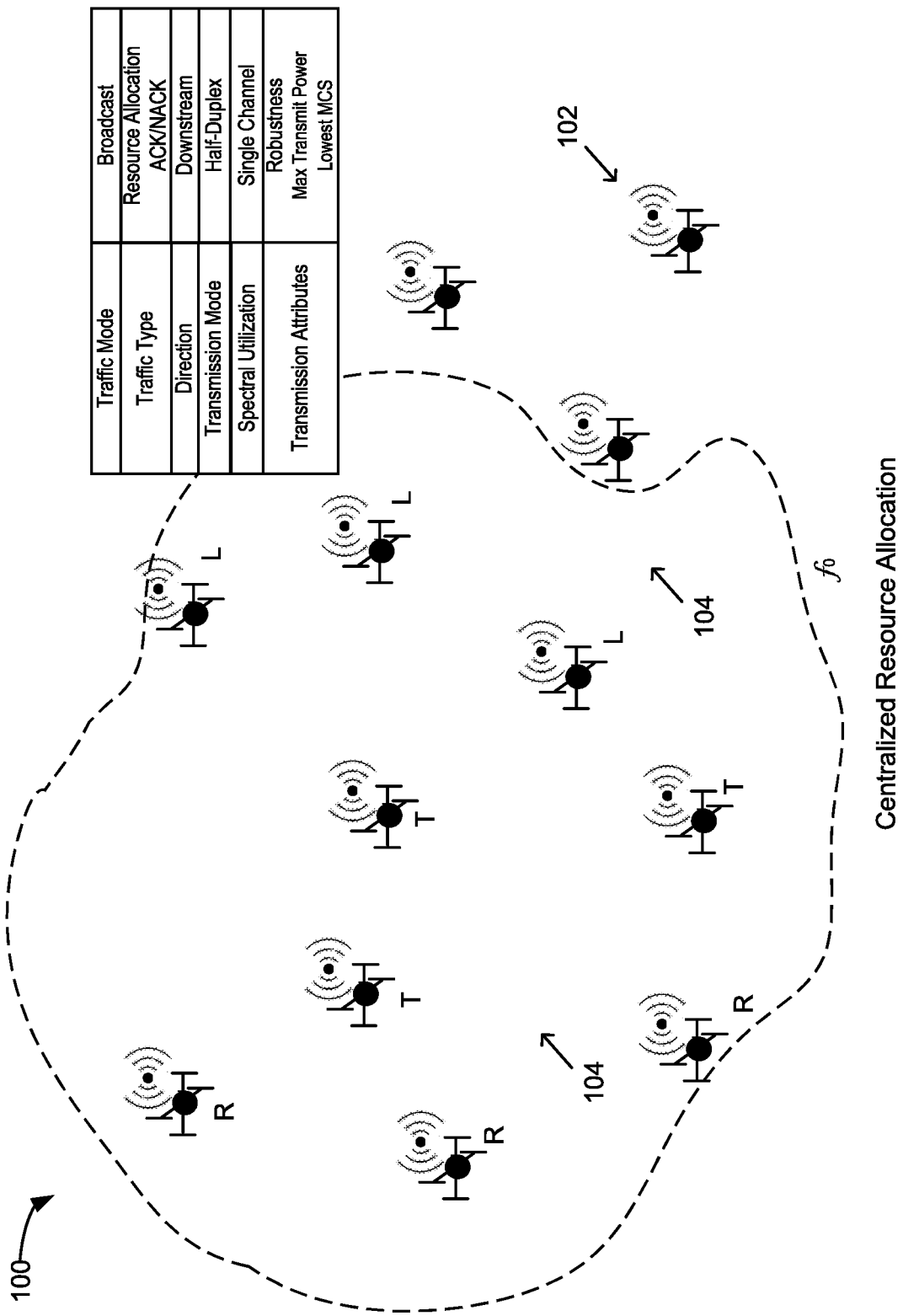
Figure 5:
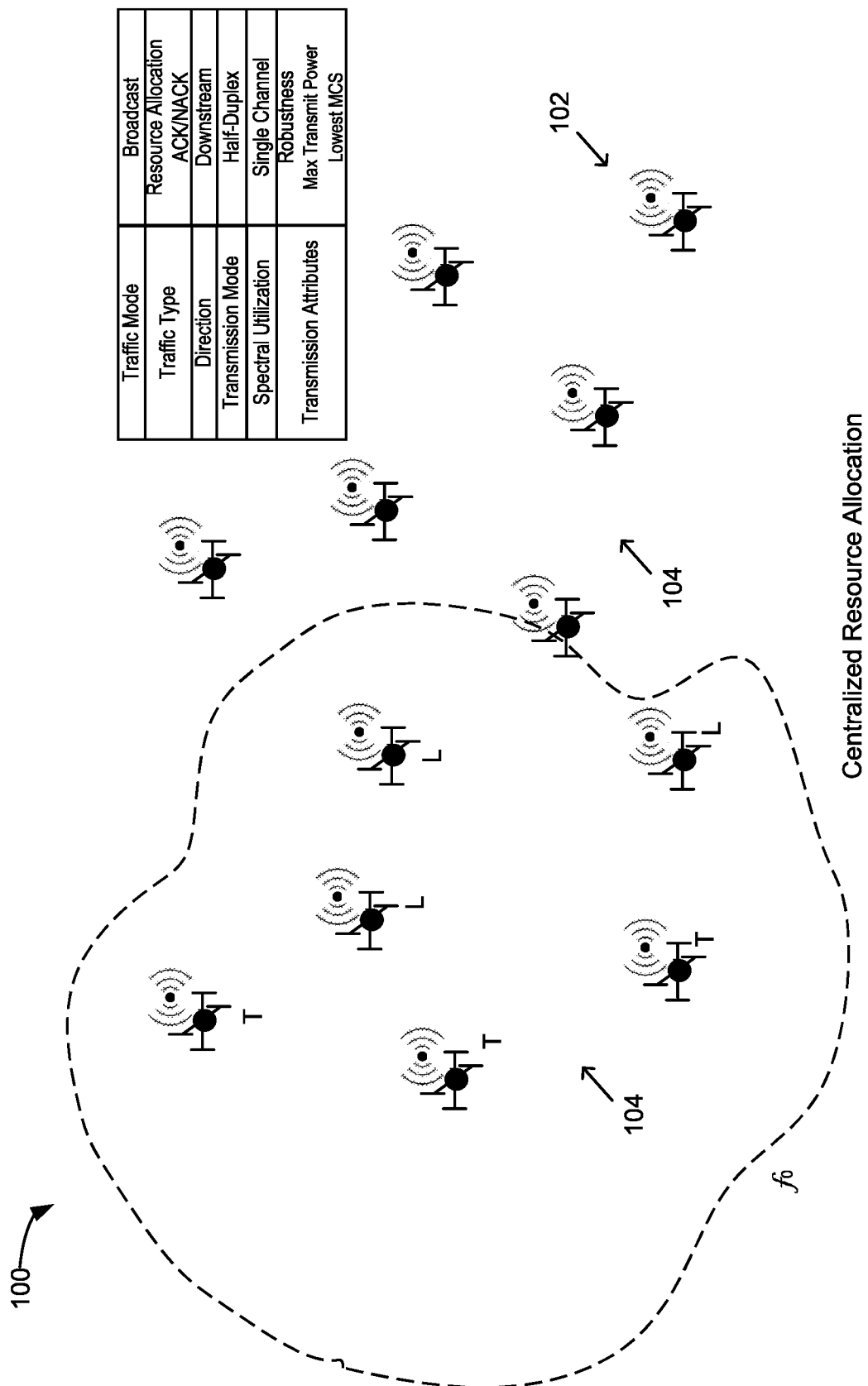

As shown in FIG. 3, the coverage footprint involved in transmitting the packet increases as the number of nodes involved in transmitting the packet at a given hop increases. As shown in FIGS. 4-5, although the broadcast packet has reached the edge of the network 100 (in FIG. 4), one more transmission is still needed (as shown in FIG. 5). Accordingly, the broadcast packet itself is formatted to contain sufficient information for edge nodes to recognize that the broadcast storm ends with them. However, the edge nodes still need to transmit so that previous-hop nodes (denoted as L in FIG. 5) know that the edge nodes have received the packet; otherwise retransmission will take place.

Figure 6:
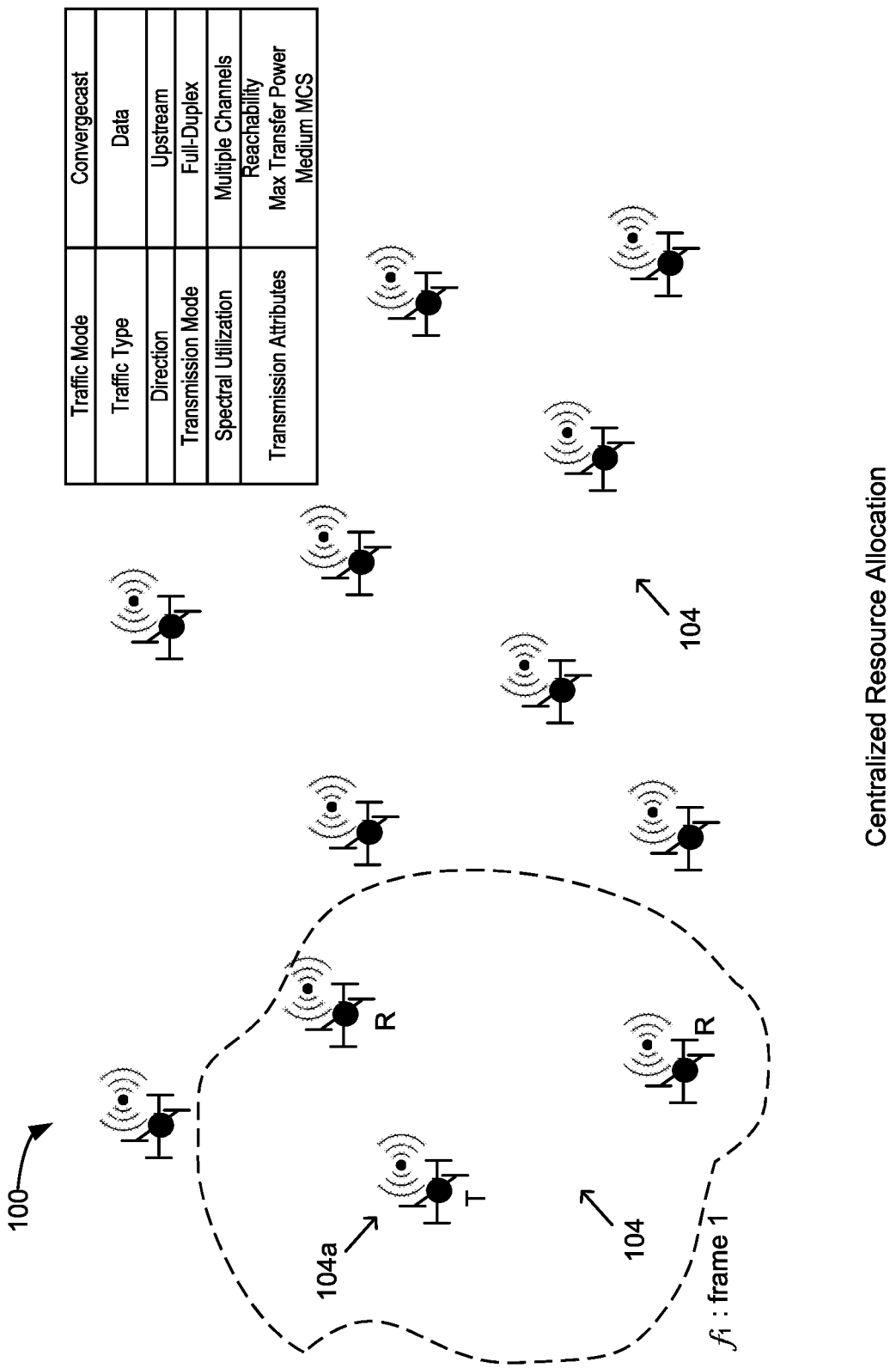
Figure 7:
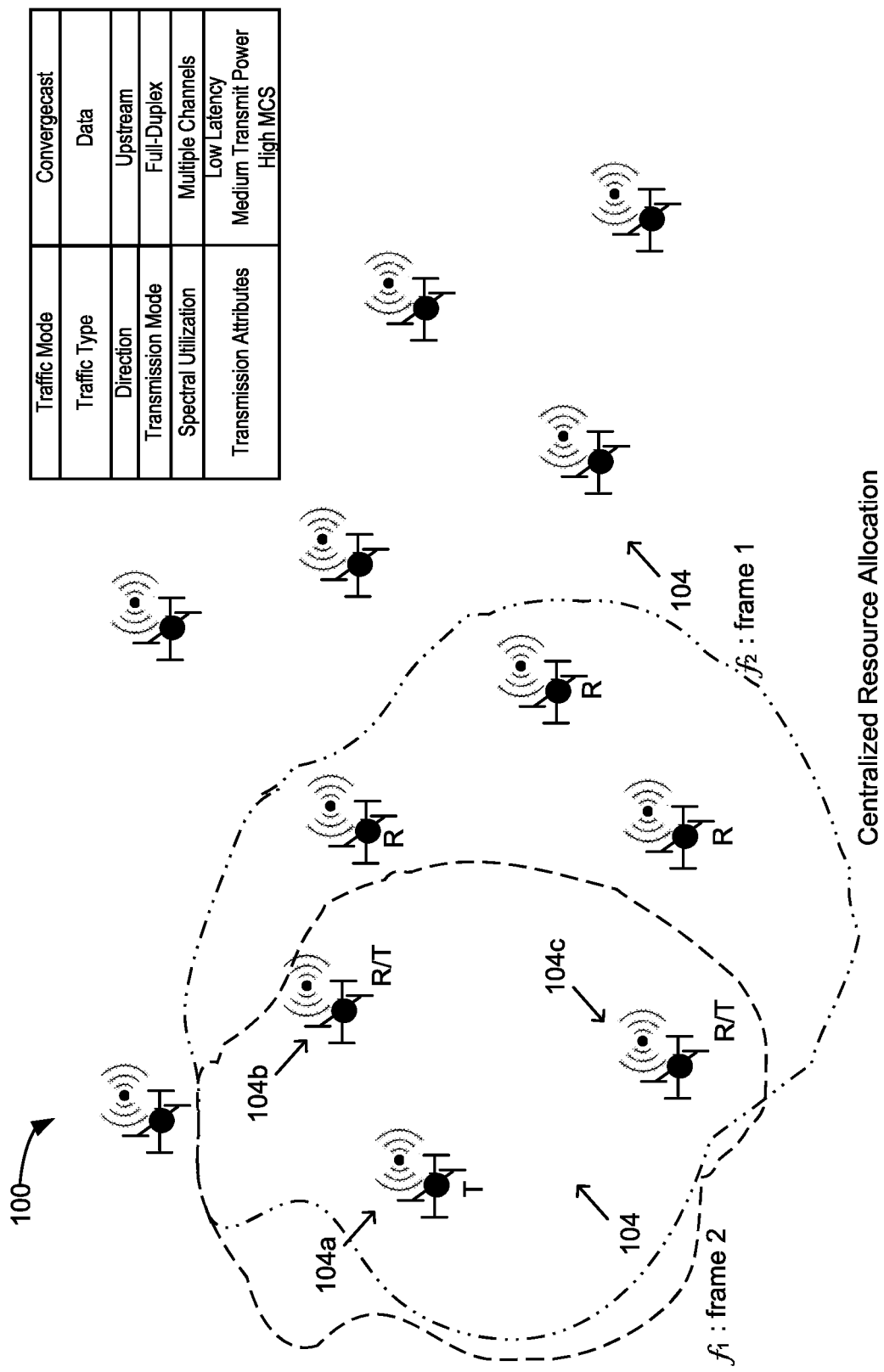
Figure 8:
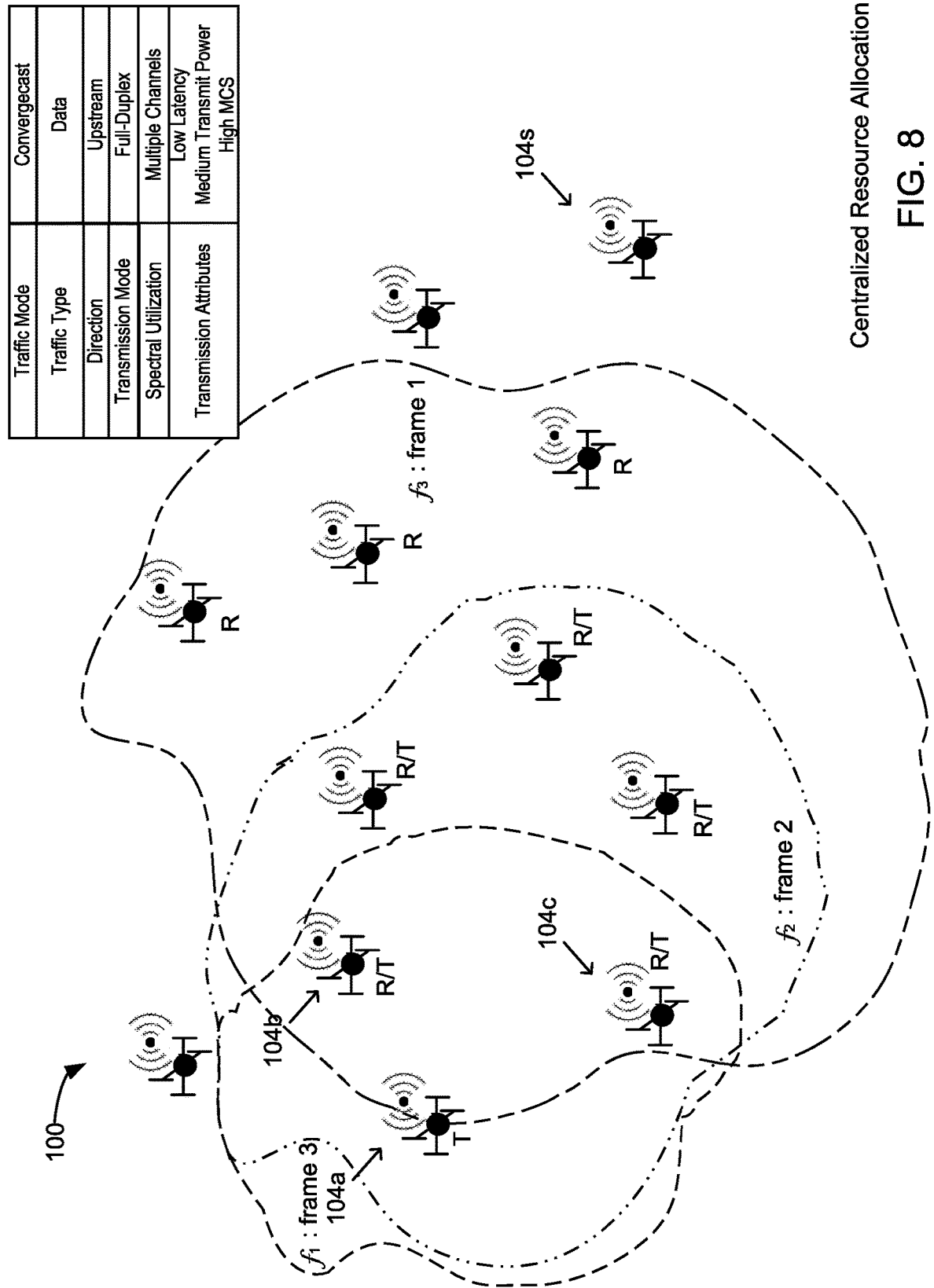
Figure 9:
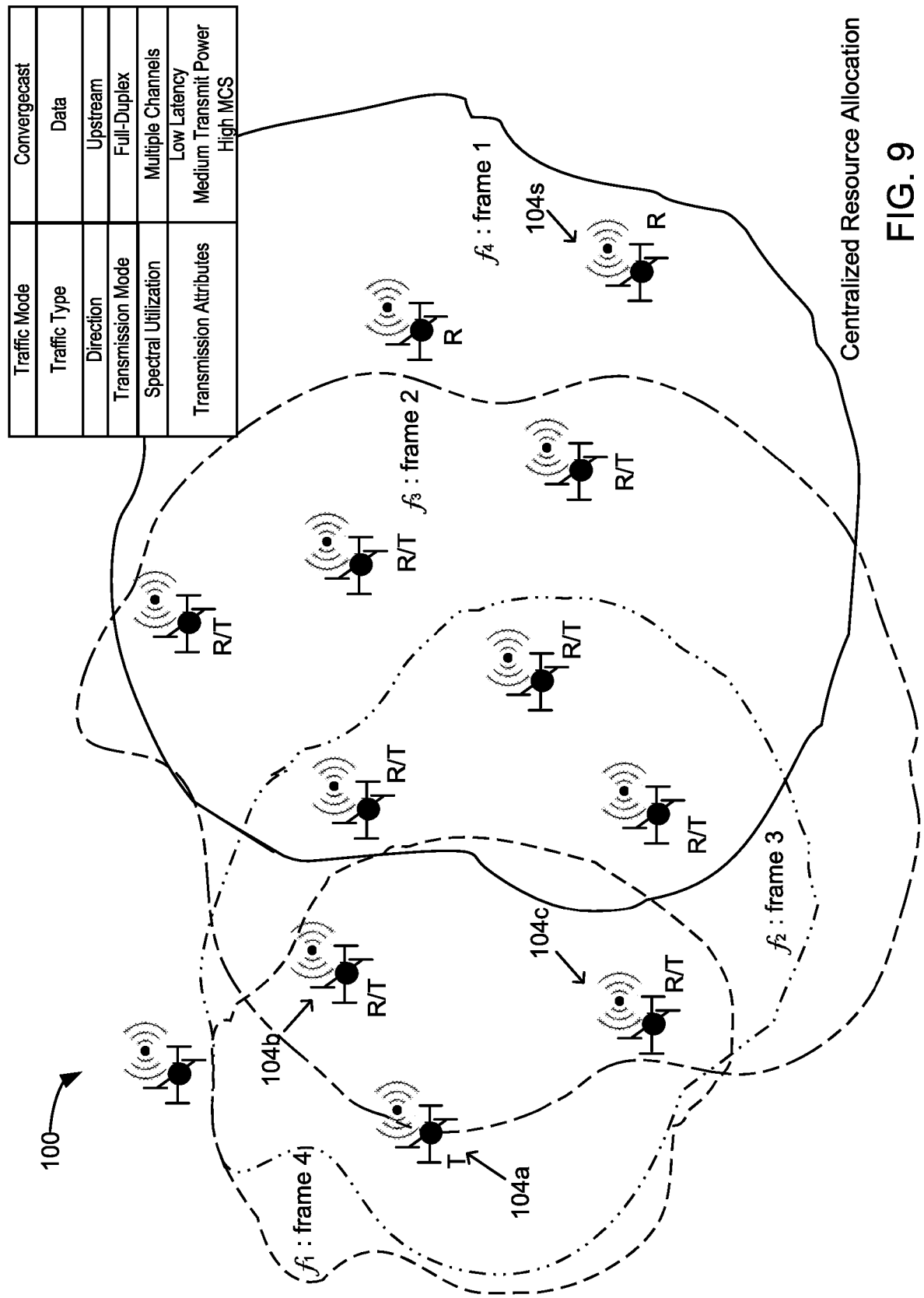

Referring now to FIG. 6, the phase involving full-duplex data transmissions is depicted in an exemplary embodiment. Here, a source node 104a designated with transmit state T performs clear channel assessment (CCA), finds the medium to be idle, and injects a frame on frequency channel $f_1$. In one embodiment, the source node 104a uses transmission attributes that are mainly geared towards enhancing reachability. As shown in FIG. 7, two nodes 104b, 104c which receive frame 1 switch it to the transmit chain and send it ahead on frequency channel $f_2$. At the same time that the two forwarding nodes 104b, 104c are transmitting the frame 1 on frequency channel $f_2$, the forwarding nodes 104b, 104c are receiving a second frame from the source node 104a on frequency channel $f_1$. In one embodiment, the forwarding nodes 104b, 104c (other than the source node 104a) revert to transmission attributes that are optimized for lowering the end-to-end latency, i.e. high MCS. In this example, the full-duplex flow of frames from the source 104a continues with a depth of three hops down the network 100, as shown in FIG. 8, in which the frame reaches the sink node 104s within four hops, as shown in FIG. 9.

Upstream Network Reservation

In contrast to the previous centralized resource allocation method, embodiments of the upstream network reservation method entails two successive upstream phases. The first one is a relatively short phase and is meant to carve a spatial corridor from source to sink. This phase is called the forwarding region setup phase and is executed in a HD single-channel mode. The second phase is longer phase in comparison and involves actual data forwarding in a FD multi-channel manner.

Embodiments of the upstream network reservation method consider the channel coherence time, i.e. the average time interval within which the channel fading coefficients remain approximately the same. A corollary to this is that the nodes who have individually chosen to become part of the upcoming data transmission/forwarding phase are very likely to experience the same channel fading coefficients in both the forwarding region setup phase and the data forwarding phase.

Therefore, the longer the coherence time is, the longer the data forwarding phase can be. The duty cycle, i.e. the ratio between the forwarding region setup phase and the data forwarding phase intervals, should be determined offline based on the average speed at which nodes are expected to move. Both phases under this method are executed using the same MCS and transmit power levels. The forwarding region setup phase acts a rehearsal for the nodes to take stage in the data forwarding phase to follow.

A. Upstream Network Reservation—Universal Broadcast

Multiple options or implementations have been considered for the upstream network reservation method in accordance with the present disclosure. Under a first option, referred as universal broadcast, all nodes 104 in a coverage area will take part in the broadcast process for a forwarding region setup even those who do not offer positive progress towards the sink. Otherwise, there will be cases where the inert parts of the ad hoc network 100 may witness the trigger of another setup process by another node. Such a scenario will result in both nodes not getting their best chance in reserving the network resources due to co-channel interference.

On the other hand however, this universal broadcast option is likely to produce a discrepancy between the forwarding region setup and the data forwarding phases in terms of the set of nodes 104 participating. This stems from the fact that some nodes may have participated in the broadcast process even though they do not offer positive progress towards the sink. During actual data transmission, these nodes will not take part in the forwarding process.

B. Upstream Network Reservation—Selective Broadcast

To alleviate the discrepancy shortfall of the previous universal broadcast option, an alternative one is described herewith and is referred as a selective broadcast option or implementation. Therefore, with this option, nodes who will not participate in the actual data transmission should not take part in the broadcast process, i.e., this is a selective broadcast process. This ensures the elimination of discrepancy between the forwarding region setup and the data forwarding phases in terms of the set of nodes 104 engaged.

One implication of the selective broadcast option pertains to a subset of network nodes not being aware of a nearby forwarding region setup process. As such, it is probable that one node from that subset may have packets to transmit and consequently selects to start its own forwarding region setup process. This shall interfere with the original forwarding region setup process. To preclude or diminish the likelihood for such an event to occur, a very robust clear channel assessment (CCA) is contemplated that provides a back-off zone that is much larger in terms of size than the coverage zone corresponding to frame detection. Therefore, in practice, the selective broadcast option may be preferred, since it avoids many of the corner cases that the universal broadcast option may suffer from due to radio and topological randomness.

Operation of Upstream Network Reservation—Selective Broadcast

The main goal of the forwarding region setup phase is to reserve network resources from source to sink along three dimensions: spatial, spectral, and temporal. In essence, it aims to create a spatial corridor between the source and the sink for a certain period of time. During the forwarding region setup process, nodes to be engaged in the data forwarding phase will individually assign transmit and receive frequencies.

Figure 10A:
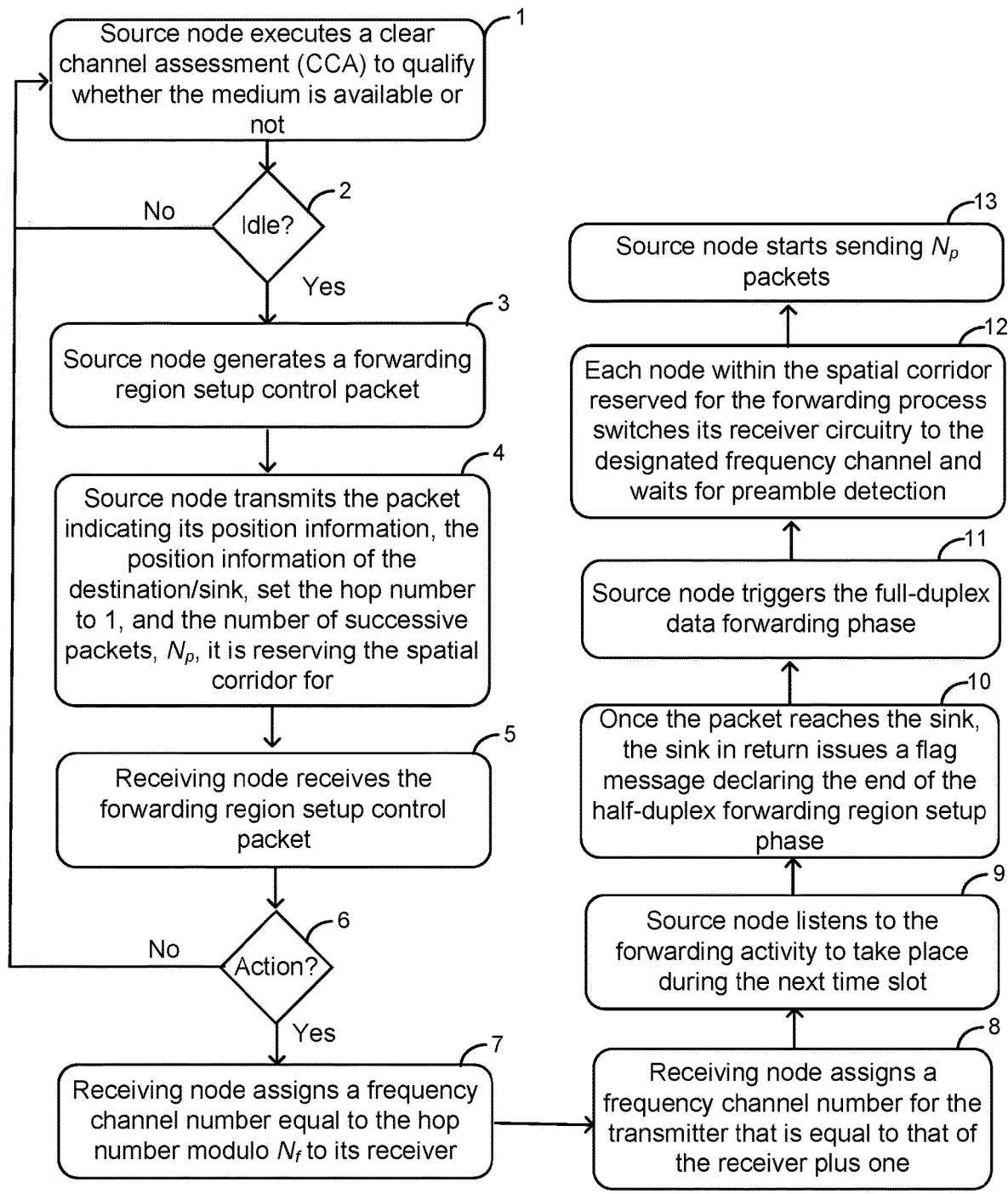
FIG. 10A is a flow chart showing steps of a forwarding region setup phase for an upstream network reservation method in accordance with embodiments of the present disclosure.
Figure 10B:
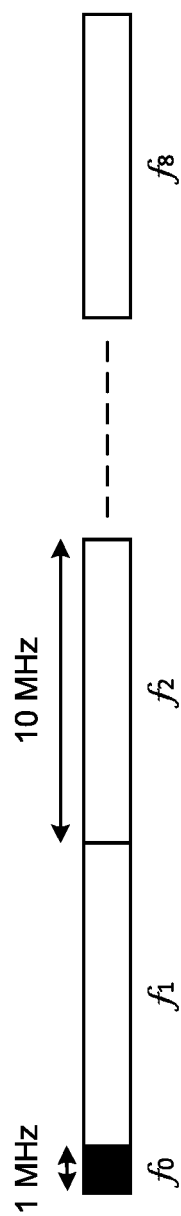
FIG. 10B is a diagram illustrating frequency assignments in accordance with various embodiments of the present disclosure.

FIG. 10A is a flow chart showing method steps in accordance with one embodiment of an autonomous cooperative routing routine in accordance with the present disclosure. The following steps (1-13) are undertaken in an exemplary embodiment of the forwarding region setup phase for the upstream network reservation—selective broadcast method. (1) To begin, the source node executes a clear channel assessment (CCA) to qualify whether the medium is available or not. (2-3) If found to be idle or available, the source node generates a forwarding region setup control packet. This half-duplex phase is assigned a narrowband channel, $f_0$, as depicted in FIG. 10. In particular, FIG. 10B depicts a 1 MHz narrowband control channel, $f_0$, and eight 10 MHz data transmission channels. (4) The source transmits the forwarding region setup control packet indicating its position information, the position information of the destination/sink, and sets the hop number to 1. The source also indicates the number of successive packets, $N_p$, it is reserving the spatial corridor for, noting that the maximum number is an offline design parameter. (5-6) A receiving node receives the forwarding region setup control packet and takes further action if positive progress geo-routing criterion applies to it (e.g., a position of the receiving nodes provides positive progress in delivery of the forwarding region setup control packet to the sink). (7) Such action includes assigning a frequency channel number equal to the hop number modulo $N_f$ to its ingress radio, i.e. the receiver. Here, $N_f$ is the number of available frequency channels. (8) On the other hand, for its egress radio (i.e. the transmitter), the receiving node assigns a frequency channel number equal to that of the receiver plus one. (9) After forwarding/transmitting the forwarding region setup control packet, a node/source listens to the forwarding activity to take place during the next time slot. This is to assure that at least one node has taken on the responsibility of forwarding it ahead. (10) Once the forwarding region setup control packet reaches the sink, the sink in return issues a flag message declaring the end of the half-duplex forwarding region setup phase.

(11) Next, the source node waits for a sufficient amount of time before the source node triggers the full-duplex data forwarding phase. The value of such a waiting time is an offline parameter. It can be an estimate of the average time duration elapsed until the selective broadcast reaches the sink or penetrates sufficiently far through the networks towards the sink. (12) Each node within the spatial corridor reserved for the forwarding process switches its receiver circuitry to the designated frequency channel, and then waits for preamble detection. (13) The source starts sending $N_p$ packets back to back. The data transmission can be performed in a connectionless manner. Alternatively, the data transmission can be implemented in a connection-oriented manner whereby acknowledgement or negative-acknowledgement (ACK/NACK) feedback is sent from the sink. For connection-oriented flows, the sink is in essence unicasting ACK/NACK of an ensemble of $N_p$ packets. For it to do so, it needs to follow the same forwarding region setup procedures outlined above.

Figure 11:
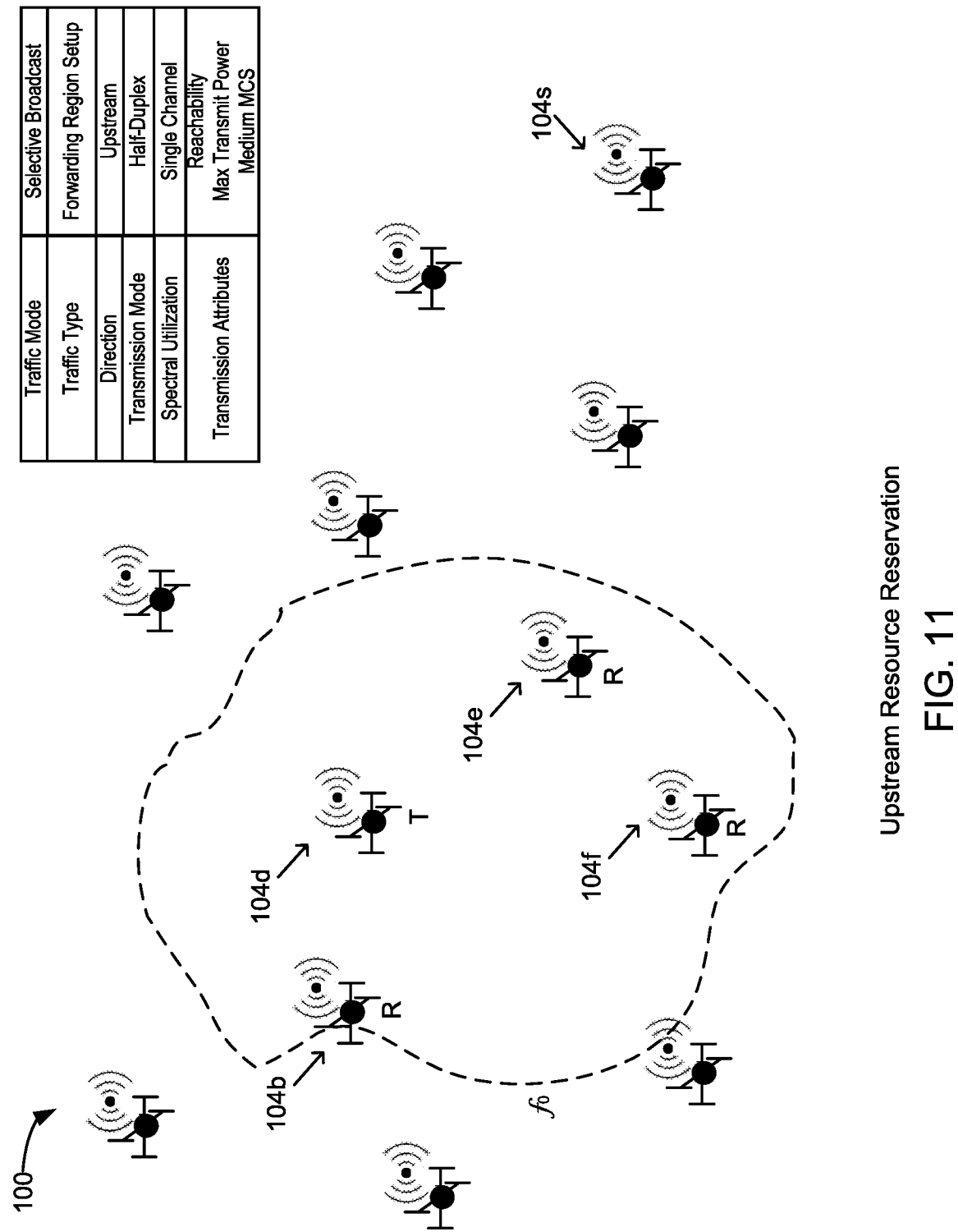
FIGS. 11-19 are diagrams illustrating a network of communication nodes performing an upstream network reservation method in accordance with various embodiments of the present disclosure.

An exemplary embodiment of the upstream network reservation—selective broadcast method is further illustrated in FIGS. 11-19. As shown in FIG. 11, after a source node 104d senses the medium to be idle, the source node 104d injects a forwarding region setup control packet at frequency channel $f_0$. The nodes 104b, 104e, 104f in the coverage footprint capable of receiving the packet are denoted with R in the figure. In one embodiment, the source node 104d uses transmission attributes that are optimized for reachability.

Figure 12:
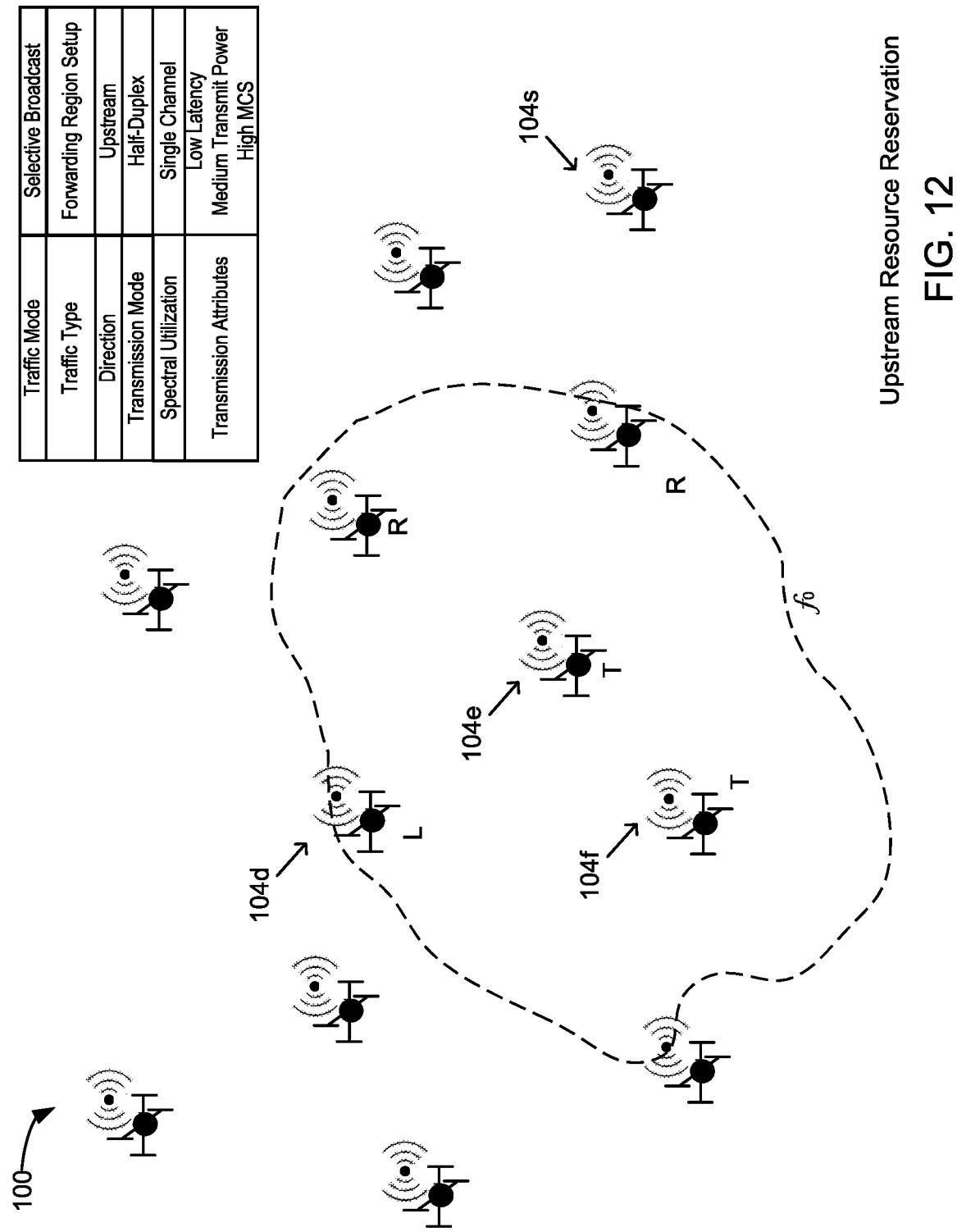

Next, as shown in FIG. 12, the only nodes 104e, 104f engaged in forwarding the packet (denoted with T in the figure) are those offering positive progress towards the sink 104s (and which are consequently going to be engaged with the actual forwarding of data packets during the data forwarding phase). Here, the source node 104d listens to make sure forwarding is taking place ahead (and is therefore denoted with L in the figure).

In one embodiment, transmission attributes optimized for lowering the latency are use from this point forward to forward the packet, mimicking what is going to be needed during the actual data packet forwarding phase. In the figures, the state T" designates retransmission. At every hop, nodes 104 compute the frequency channel numbers for the receive and transmit channels that will also be used during the upcoming data forwarding or transmission phase.

Figure 13:
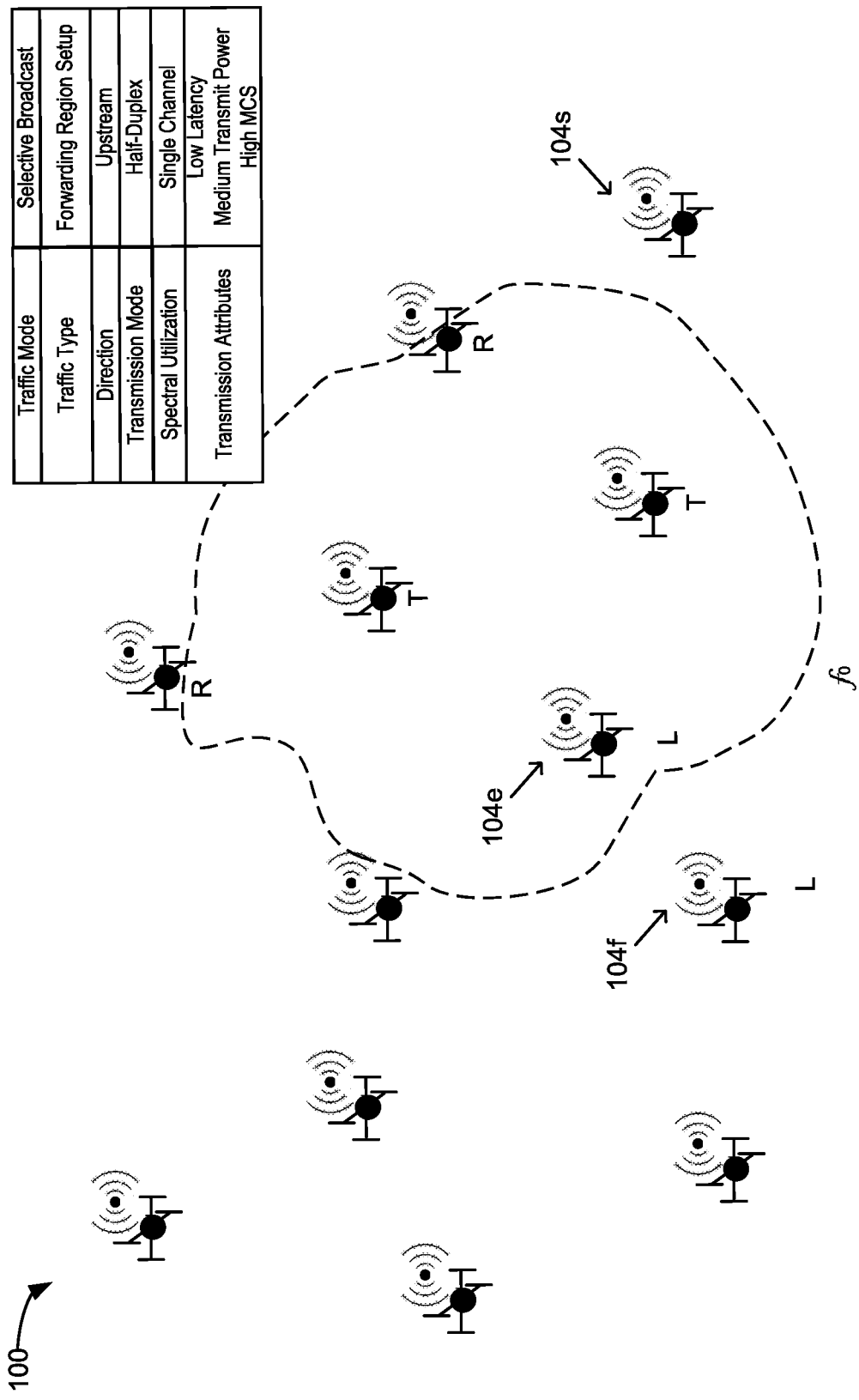
Figure 14:
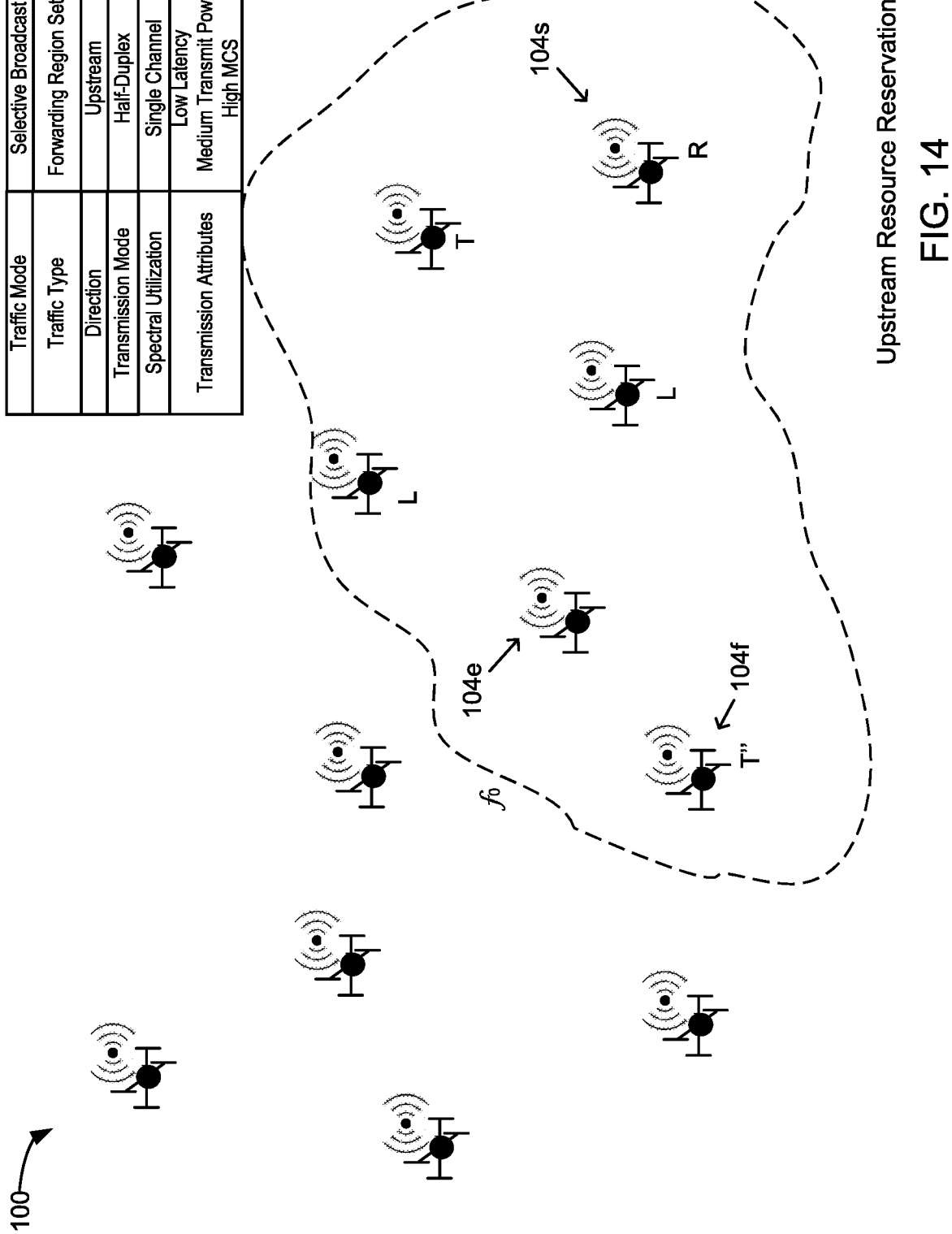
Figure 15:
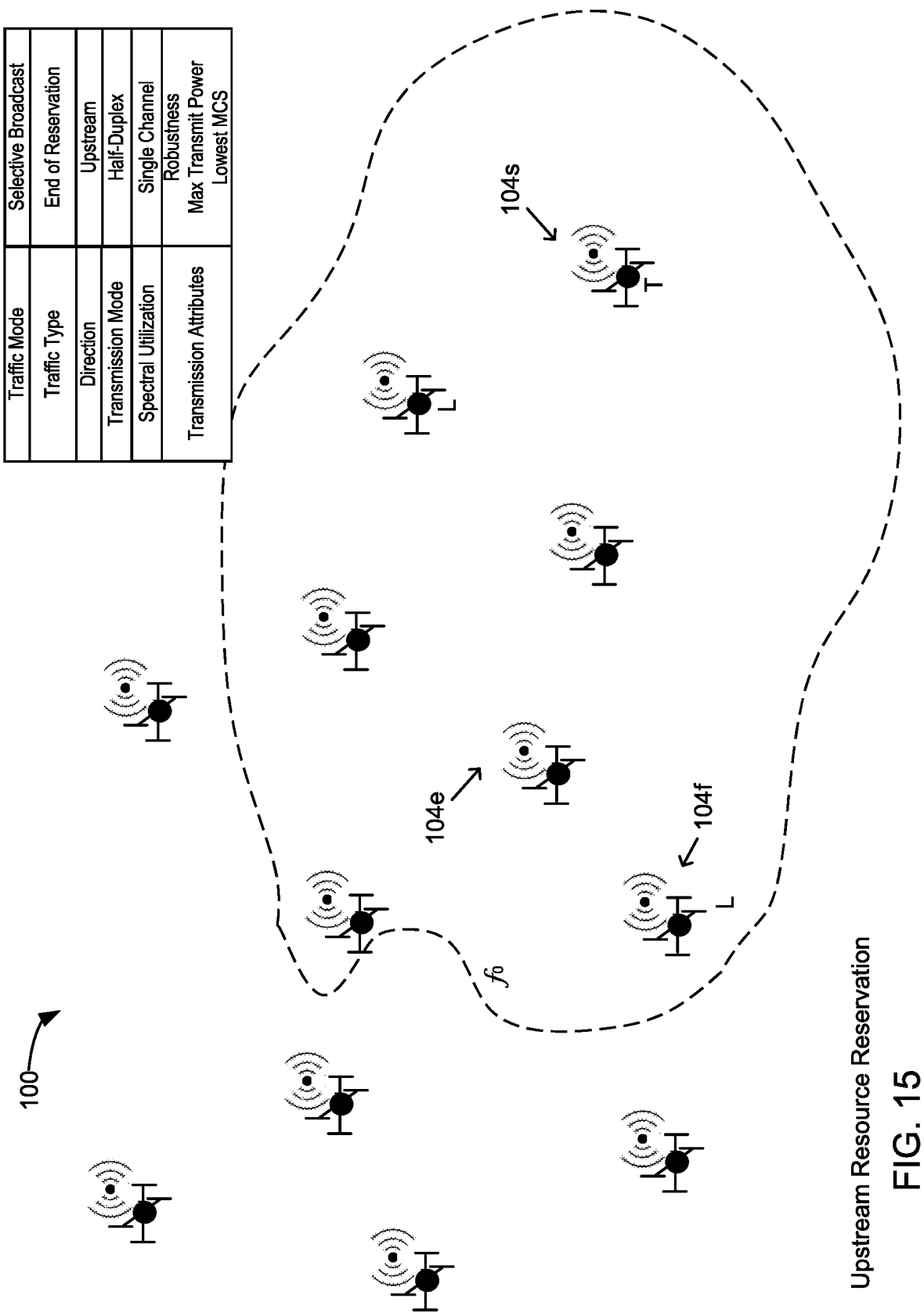

Next, in FIG. 13, the half-duplex region setup process continues on the same frequency channel $f_0$ allocated for this purpose. In this specific illustration, one of the previous-hop nodes, 104f, in Listen state L, fails to detect the forwarding capability as it happens to occur outside the coverage contour or footprint. Thus, the node 104f will retransmit in the next slot, as shown in FIG. 14 and represented with T" in the figure. Then, after the packet reaches the sink 104s, the sink 104s in return transmits a high-power packet to declare an end-of process, as shown in FIG. 15.

Figure 16:
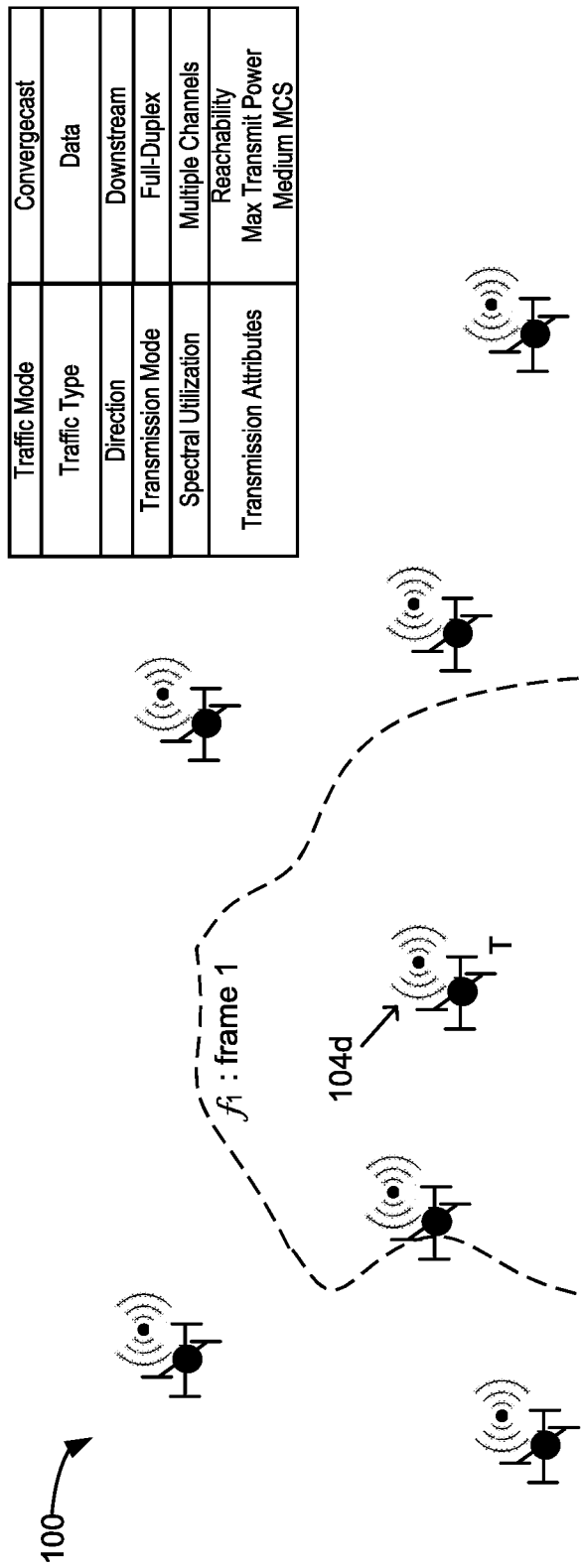
Figure 16:
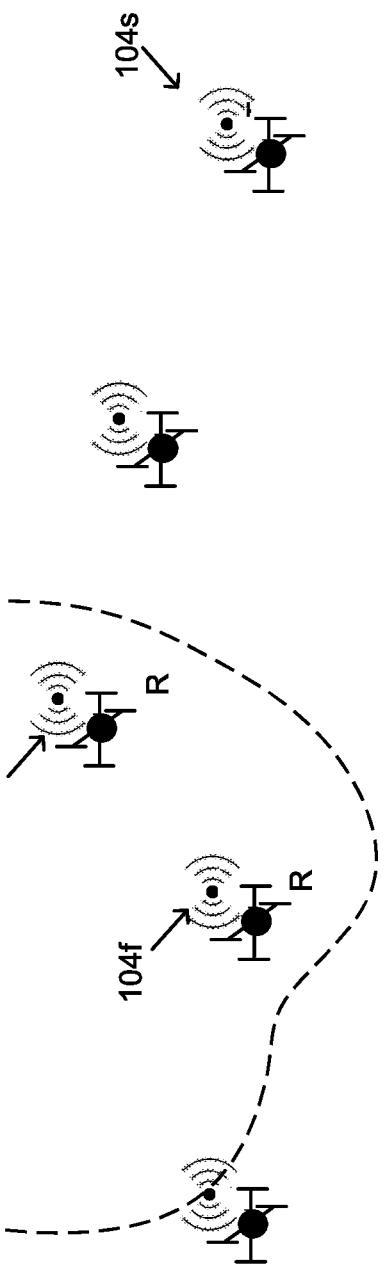
Figure 17:
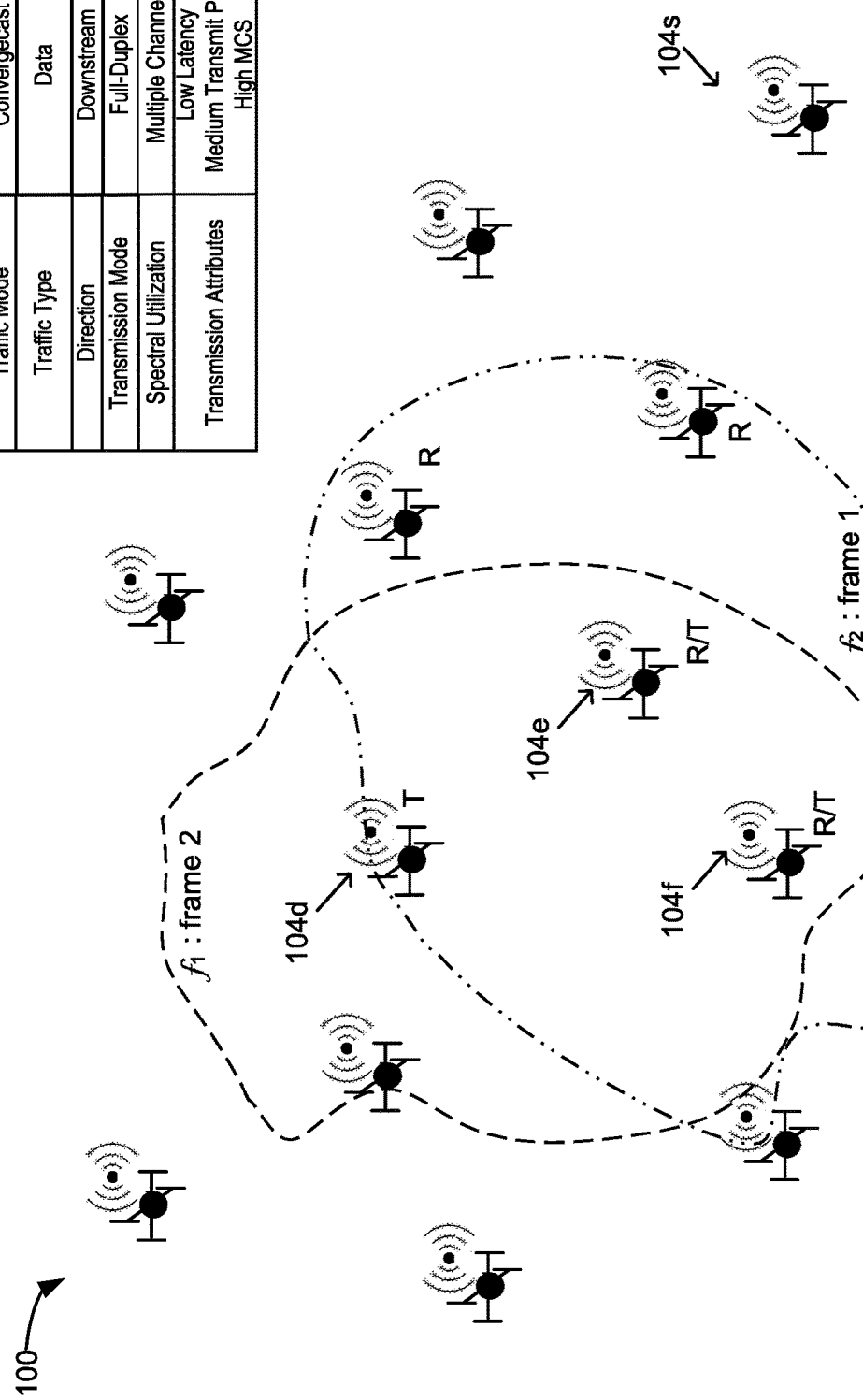
Figure 18:
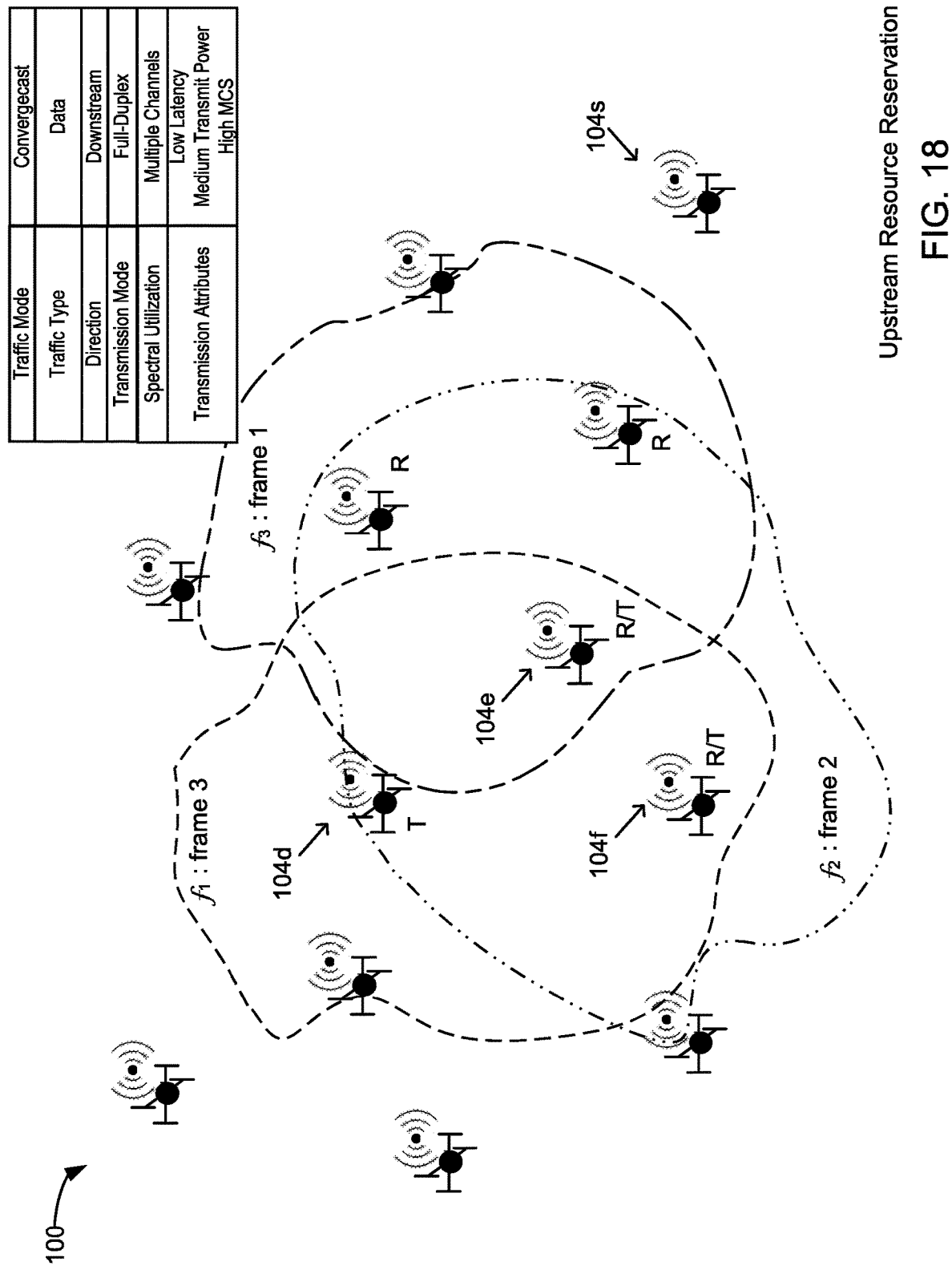
Figure 19:
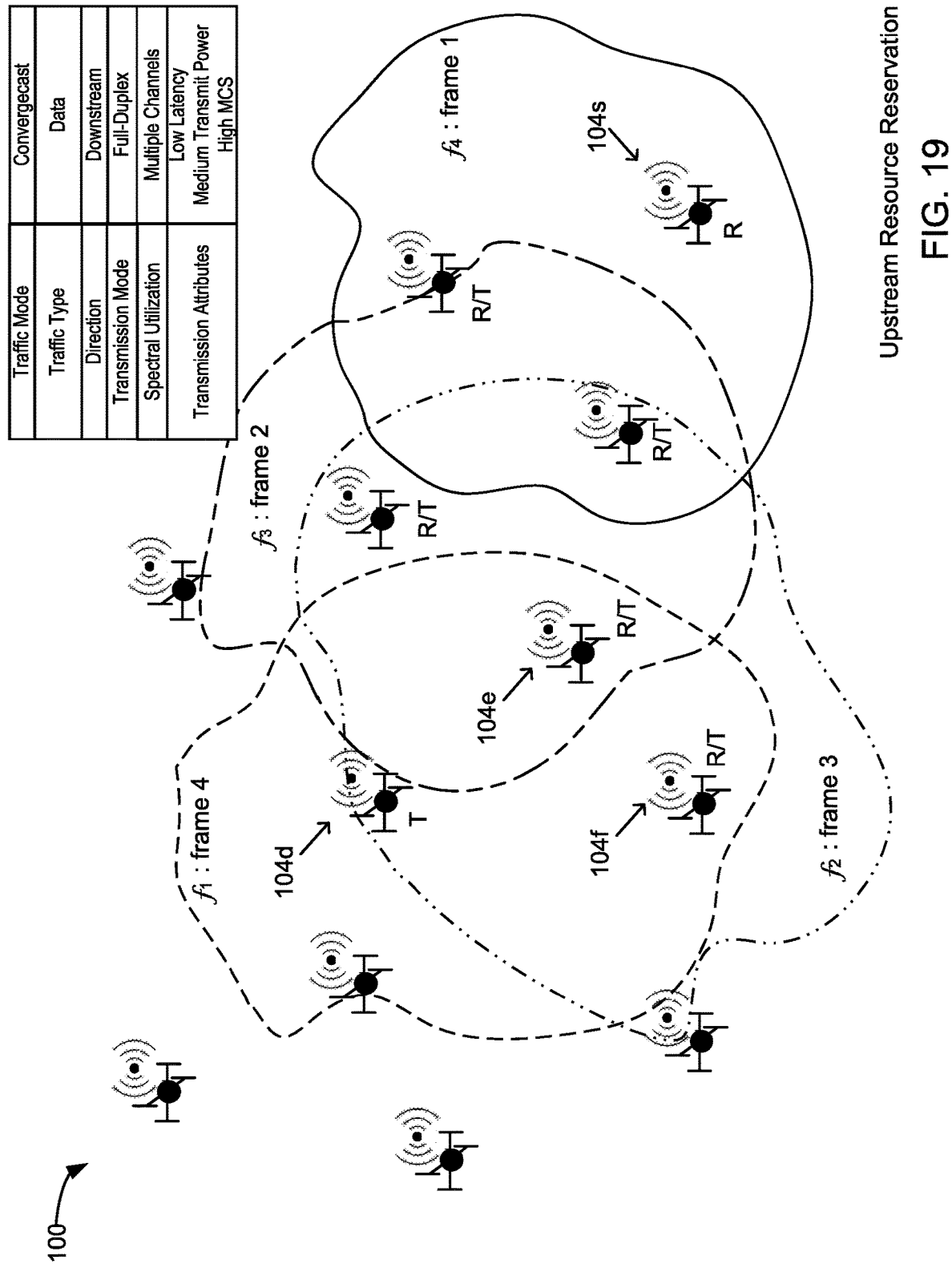

Consequently, FIG. 16 shows a source node 104d transmitting a packet as part of the data forwarding or transmission phase. The data forwarding process begins on the frequency channels computed during the forwarding region setup phase. In one embodiment, a source node transmits using reachability attributes. As represented in FIG. 17, only nodes 104e, 104f who were determined before (in the forwarding region setup phase) to be offering positive progress towards the sink 104s stay engage in the forwarding process. In FIG. 18, the source node 102d continues to inject frames successively into the network 100 whereby forwarding ahead of the packets is taking place in a full-duplex manner. It is noted that due to full-duplex mode of operation, the listening function (L) is excluded, as shown in FIG. 19. However, as previously mentioned, certain embodiments employ mechanisms to acknowledge or negatively acknowledge packets received by the sink.

Further Considerations

For a more comprehensive description, the following considerations and special cases are also contemplated in various embodiments of the upstream network reservation method.

Node wake-up during an ongoing data forwarding phase: When a node wakes up, it will tune to the narrowband control channel $f_0$. As such, even if a node wakes up during the full-duplex data transmission phase, the node will neither detect the transmission nor will it interfere with it.

On the other hand, if this node performs CCA prior to sending a packet, the node will likely find the control channel to be idle, since nodes in proximity are transmitting on the wideband data transmission channels. However, this waking up node will not manage to find an audience. Instead, the node keeps persistently performing CCA on the control channel $f_0$ until nodes in proximity finish the data transmission task they are engaged in and revert back to control channel $f_0$.

Moreover, the data transmission taking place in proximity at another frequency will not be affected. This should be contrasted to the half-duplex case whereby every attempt to transmit a packet increases the interference level overall.

Data forwarding time-out: As indicated earlier, a source node reserves the spatial corridor for transmitting $N_p$ packets. Intermediate nodes expect to forward $N_p$ packets. However, if after receiving a certain number of packets less than $N_p$, a forwarding node fails to receive any new packet for a long period of time (time-out interval), the forwarding node tunes back to control channel $f_0$. The value of this time-out interval should not generally exceed $(1+p_r) N_p T_h$, where $T_h$ is the typical hop duration, and $p_r$ is the retransmission rate historically observed by the node about to time out.

Multi-flow networks: In relatively small networks (up to 10 nodes), it is expected that a single flow typically would occupy the whole network. However, as the number of nodes increases, the likelihood of entertaining multiple flows also increases. In that case, sources must use different frequency channels so as to reduce cross-flow interference.

Figure 20:
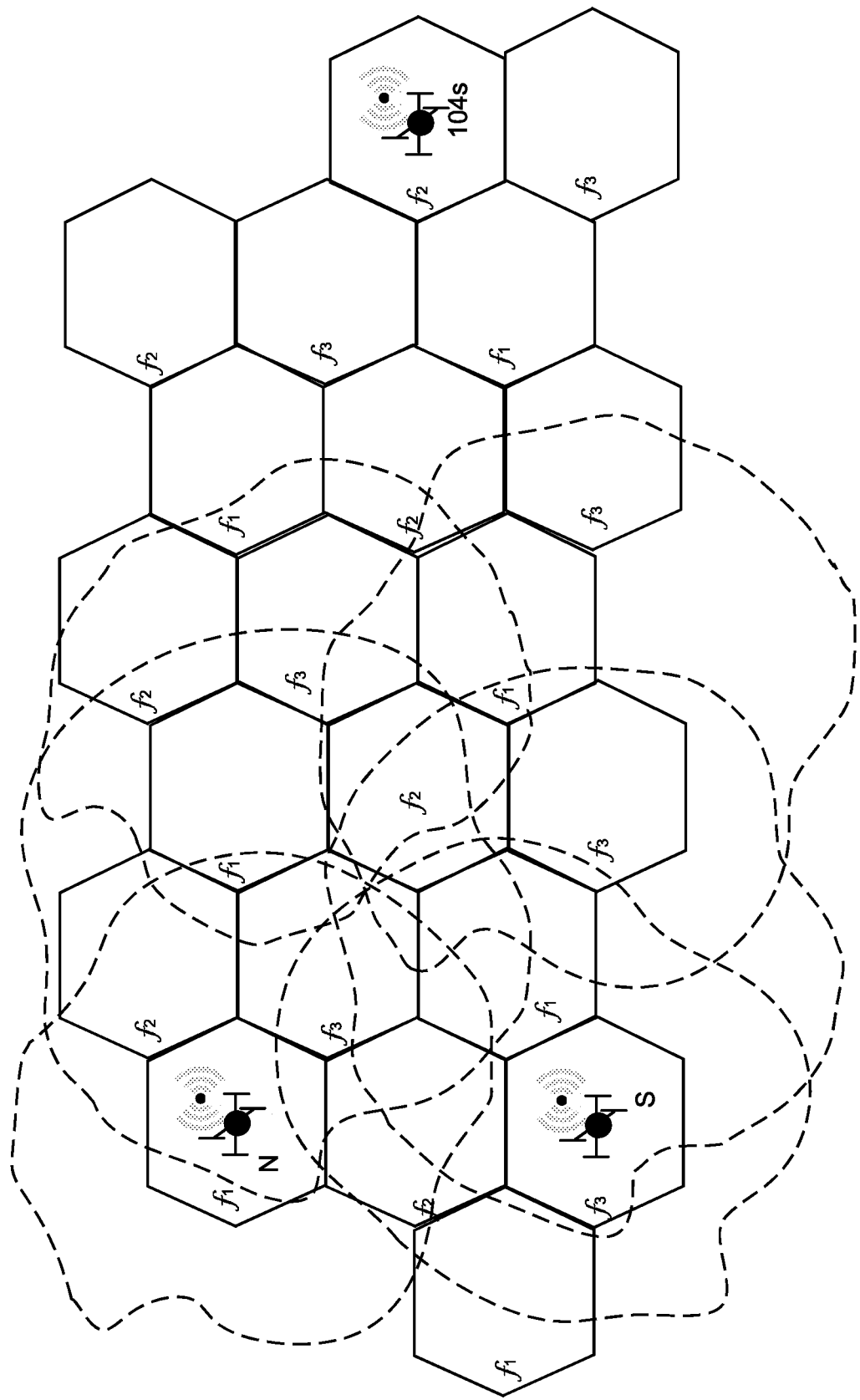
FIG. 20 is a diagram illustrating an exemplary process for dividing a network space into virtual geographical blocks whereby each block is assigned a different initial transmission frequency in accordance with various embodiments of the present disclosure.

One possible method to reduce cross-flow interference is to reuse the frequency spectrum wisely. This can be achieved by dividing the network space into virtual geographical blocks whereby each block is assigned a different initial transmission frequency as illustrated in FIG. 20. In this non-limiting example, two concurrent flows are shown in which a northern source node (N) can transmit at channel $f_1$ while a southern source node (S) can transmit at channel $f_3$. Intermediate nodes in each flow compute their transmission frequencies based on the hop number. The allocation of initial transmission frequencies to hexagonal grids helps reduce interference in the network. Such geographical division can be done using a number of geometrical basis, for example, squares and hexagons.

There is a broad spectrum of possible applications for embodiments of the upstream network reservation and centralized resource allocation techniques of the present disclosure. Examples include the use of a swarm of unmanned autonomous vehicles (UAV) for thermal imaging and remote sensing. UAV clusters have been also considered for 3D mapping, surveying, and other civil engineering tasks. Swarms of terrestrial robotic agents are also being increasingly considered for some time-critical field operations most notably for search and rescue and tactical missions. Another manifestation of team-based mobile cyber-physical systems includes task-oriented teams of paramedics and first responders during disasters or massively crowded events.

The availability of real-time video communications for those scenarios is indeed a powerful tool for collaborative decision-making and optimal mission execution. A paramount task for team-based mobile cyber-physical system is the joint planning and optimization of motion trajectories of the mobile devices. The timeliness of disseminating path planning and control signaling messages is crucial. Hence, end-to-end latency is a major performance metric. UAV-based cyber-physical systems may be quite bandwidth-hungry. This is true since real-time video communication is sought between the team members. As a special case of mobile ad hoc networks (MANET), team-based mobile cyber-physical systems undoubtedly push the envelope in terms of latency and throughput requirements.

Mobile workforce network systems entail the deployment of teams of autonomous robots (unmanned vehicles) as well as human agents to accomplish certain critical missions. Within such a context, swarms of unmanned aerial or terrestrial vehicles are dispatched into the field to conduct a mission under human supervision or control, or in other instances jointly with human agents. A broad spectrum of applications are possible. Examples include the use of a swarm of unmanned aerial vehicles (UAV) for thermal imaging and remote sensing. UAV clusters have been also considered for 3D mapping, surveying, and other civil engineering tasks. Swarms of terrestrial robotic agents are also being increasingly considered for some time-critical field operations most notably for search and rescue and tactical missions. Another manifestation of team-based mobile workforce systems includes task-oriented teams of paramedics and first responders during disasters or massively crowded events. The availability of real-time video communications for those scenarios is indeed a powerful tool for collaborative decision-making and optimal mission execution.

Consequently, this disclosure is applicable for the following market segments, among others: (1) Civil (a. Public safety, b. First responders, c. Paramedics, and d. Search & rescue); (2) Security & defense (a. Law enforcement, b. Tactical operations, and c. Dismounted soldier networks). Needs sought by these customer segments include: (1) Establish a collaborative work environment (CWE) among personnel in the field; (2) Eliminate inefficiencies and risks pertaining to missing or miscommunicated info in the field; (3) Coordinate path trajectories to maximize area coverage by field personnel, and (4) Enable in-situ collaborative decision-making in the face of unexpected event. Benefits to end-users are numerous, to list a few: (1) Reduce time to complete a mission; (2) Reduce chances of field personnel injuries; (3) Reduce training costs of junior staff; and (4) In the specific case of civil workforces in service during natural disasters or emergency situations: a. Reduce human casualties; b. Reduce execution time of evacuation plans; and c. Reduce "no-report" rates in evacuation plans.

Certain embodiments of the present disclosure can be implemented in hardware, software, firmware, or a combination thereof. In one embodiment, frequency assignment-related functions or processes are implemented in software or firmware that is stored in a memory and that is executed by a suitable instruction execution system. If implemented in hardware, as in an alternative embodiment, the frequency assignment-related functions can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 21:
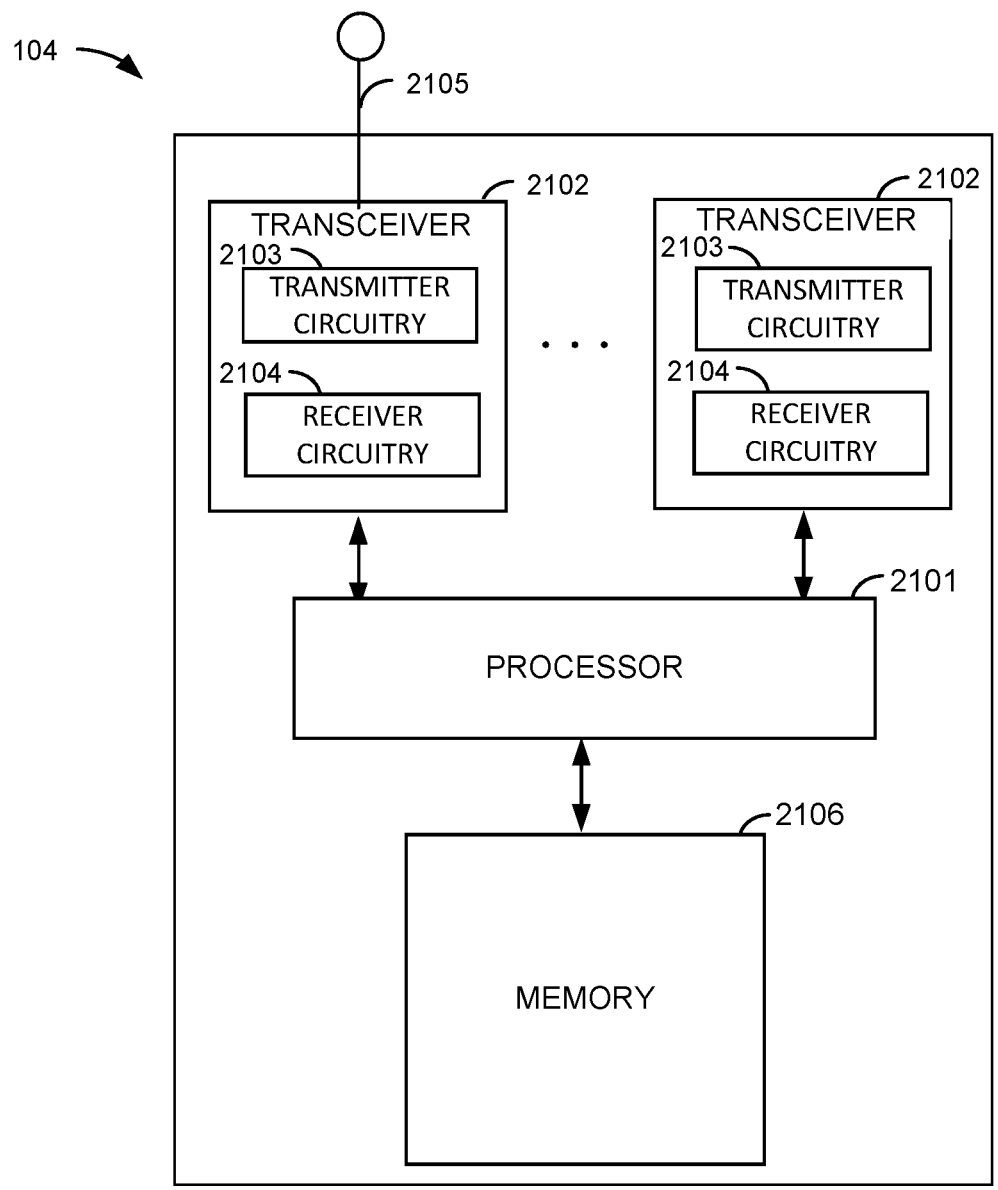
FIG. 21 is a block diagram of an exemplary communication node for operation within an ad hoc network in accordance with embodiments of the present disclosure.

FIG. 21 is a block diagram of an example of a communication node 104 for operation within the ad hoc network 100 of FIG. 1. The communication node 104 comprises a processor 2101, one or more transceivers 2102, each including a transmitter circuitry 2103 and a receiver circuitry 2104, an antenna array 2105 coupled to at least one of the transceivers 2102, and a memory 2106 for storing operating instructions, such as for one or more autonomous cooperative routing routines, that are executed by the processor 2101. The transceiver 2102 receives and transmits signals, such as packetized signals, to and from other communication nodes or devices, under the control of a processor 2101. Having multiple transceivers allows a communication node to participate in multiple data forwarding flows at the same time as long as physical and radio frequency (RF) constraints of the antenna array are respected. The communication node 104 optionally includes a display, an input device, a buffer memory, and communication interfaces. Although not shown, the communication node 104 also includes an antenna switch, duplexer, circulator, or other highly isolative means (not shown) for intermittently providing information packets from the transmitter circuitry 2103 of the transceiver 2102 to the antenna 2105 and from the antenna 2105 to the receiver circuitry 2104 of the transceiver 2102. The communication node or device 104 can be an integrated unit containing at least all the elements depicted in FIG. 21, as well as any other elements necessary for the communication node 104 to perform its particular functions. Alternatively, the communication node 104 can comprise a collection of appropriately interconnected units, wherein such units perform functions that are equivalent to the functions performed by the elements of the node 104. For example, the communication node 104 may comprise a laptop computer and a wireless LAN (local area network) card.

In one embodiment, the processor 2101 includes one or more microprocessors, microcontrollers, DSPs (digital signal processors), state machines, logic circuitry, or any other device or devices that process information based on operational or programming instructions. Such operational or programming instructions are, for example, stored in the memory 2106. The memory 2106 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 2101 has one or more of its functions performed by a state machine or logic circuitry, the memory 2106 containing the corresponding operational instructions may be embedded within the state machine or logic circuitry.

The transmitter circuitry 2103 and the receiver circuitry 2104 enable the communication node/device 104 to communicate information packets to and acquire information packets from the other devices. In this regard, the transmitter circuitry 2103 and the receiver circuitry 2104 include conventional circuitry to enable digital or analog transmissions over a wireless communication channel.

The implementations of the transmitter circuitry 2103 and the receiver circuitry 2104 depend on the implementation of the node/device 104. For example, the transmitter circuitry 2103 and the receiver circuitry 2104 can be implemented as an appropriate wireless modem, or as conventional transmitting and receiving components of two-way wireless communication devices. For a wireless communication device, the transmitter circuitry 2103 and the receiver circuitry 2104 can be implemented as part of the wireless device hardware and software architecture in accordance with known techniques. Most, if not all, of the functions of the transmitter circuitry 2103 and/or the receiver circuitry 2104 can be implemented in a processor, such as the processor 2101. However, the processor 2101, the transmitter circuitry 2103, and the receiver circuitry 2104 have been artificially partitioned herein to facilitate a better understanding.

The receiver circuitry 2104 is designed to allow receiving of RF signals from within at least one bandwidth and optionally more bandwidths, if the communications with the proximate device are in a frequency band other than that of the network communications. The receiver circuitry 2104 may optionally comprise a first receiver and a second receiver, or one receiver designed to allow receiving within two or more bandwidths. The transceiver 2102 includes at least one set of transmitter circuitry 2103. The at least one transmitter 2103 may be designed to allow transmitting to multiple devices on multiple frequency bands or channels. As with the receiver circuitry 2104, dual transmitters 2103 may optionally be employed where one transmitter is for the transmission to a proximate device or direct link establishment to WLAN's and the other transmitter is for transmission to a cellular base station. The antenna 2105 comprises any known or developed structure for radiating and receiving electromagnetic energy in the frequency range containing the wireless carrier frequencies.

Any process descriptions or blocks in the flow chart(s) should be understood as representing modules, segments, or portions of code which include one or more executable instructions for implementing specific logical functions or steps in the process, and alternate implementations are included within the scope of embodiment(s) of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and protected by the following claims.

Therefore, at least the following is claimed:

1. A full-duplex autonomous cooperative routing method comprising:

transmitting, by a source communication node in an ad hoc network, a forwarding region setup control packet to a plurality of relay communication nodes in the ad hoc network over a half-duplex frequency channel, wherein each of the plurality of relay communication nodes receives and transmits the forwarding region setup control packet on a first frequency channel in different time slots, wherein the forwarding region setup control packet allows other communication nodes to autonomously compute frequency channel assignments for forwarding a plurality of packets during a full-duplex data transmission;

listening, by the source communication node, for forwarding activity with respect to the forwarding region setup packet to take place during a next time slot;

after detecting that the forwarding region setup control packet reaches a sink communication node, receiving a flag message declaring an end of the half-duplex forwarding region setup phase from the sink communication node; and transmitting, by the source communication node, the plurality of data packets on a full-duplex frequency channel over the ad hoc network towards the sink communication node during the full-duplex data transmission, wherein at least one of the plurality of relay communication nodes simultaneously receives a second one of the plurality of data packets on a second frequency channel and transmits a first one of the plurality of data packets on a third frequency channel.

2. The method of claim 1, wherein the forwarding region setup control packet indicates position information for the source communication node, position information of the sink communication node, and sets a hop number to 1.

3. The method of claim 2, wherein the forwarding region setup control packet further indicates a number of successive packets Np that the source communication node is reserving a spatial corridor for during the full-duplex data transmission.

4. The method of claim 3, wherein the first frequency channel is used exclusively for transmitting the forwarding region setup control packet and the second and third frequency channels are used exclusively for transmitting and receiving the plurality of data packets, the method further comprising tuning, by a relay communication node, to the first frequency channel after failing to receive a new packet for a time-out interval and having received less than Np packets.

5. The method of claim 3, wherein the second and third frequency channels are different for at least two of the plurality of relay communication nodes, the method further comprising:

assigning for its ingress receiver as the second frequency channel, by a relay communication node, a first frequency channel number equal to a hop number modulo Nf, wherein Nf is a number of available frequency channels; and assigning for its egress transmitter as the third frequency channel, by the relay communication node, a second frequency channel number equal to that of the first frequency channel number plus one.

6. The method of claim 3, wherein the second and third frequency channels are different for at least two of the plurality of relay communication nodes, the method further comprising:

assigning for its ingress receiver as the second frequency channel, by a relay communication node, a first frequency channel number based on a geographical block to which the relay communication node is positioned; and assigning for its egress transmitter as the third frequency channel, by the relay communication node, a second frequency channel number equal to that of the first frequency channel number plus one.

7. The method of claim 1, wherein a receiving relay communication node receives the forwarding region setup control packet and takes further action if a position of the receiving communication node provides positive progress in delivery of the forwarding region setup control packet to the sink communication node.

8. The method of claim 1, wherein a receiving relay communication node receives the forwarding region setup control packet and takes further action regardless if a position of the receiving communication node provides positive progress in delivery of the forwarding region setup control packet to the sink communication node.

9. The method of claim 1, wherein the first frequency channel is not used during full-duplex data transmissions.

10. The method of claim 9, further comprising tuning, by the relay communication node, to the first frequency channel after waking up.

11. The method of claim 1, further comprising determining an initial transmission frequency channel for the full-duplex data transmission based on a geographical block to which the source communication node is positioned.

12. A full-duplex autonomous cooperative routing method comprising:

transmitting, by a source communication node in an ad hoc network, a forwarding region setup control packet to a plurality of relay communication nodes in the ad hoc network over a half-duplex frequency channel, wherein the forwarding region setup control packet allows other communication nodes to autonomously compute frequency channel assignments for forwarding a packet during a full-duplex data transmission;

listening, by the source communication node, for forwarding activity with respect to the forwarding region setup packet to take place during a next time slot;

after detecting that the forwarding region setup control packet reaches a sink communication node, receiving a flag message declaring an end of the half-duplex forwarding region setup phase from the sink communication node; and transmitting, by the source communication node, the packet on a full-duplex frequency channel over the ad hoc network towards the sink communication node during the full-duplex data transmission, wherein a back-off zone for the source communication node is larger than a size of a corresponding coverage zone corresponding to frame detection.

13. A full-duplex autonomous cooperative routing method comprising:

distributing, by a central station communication node in an ad hoc network, a broadcast packet to a plurality of additional communication nodes in the ad hoc network over a half-duplex frequency channel, wherein, for each of the plurality of additional communication nodes, the distribution of the broadcast packet involves receiving and transmitting the broadcast packet on a same frequency channel and at different times, wherein the broadcast packet allows the plurality of additional communication nodes to autonomously compute frequency channel assignments for forwarding a packet during a full-duplex data transmission; and distributing, by a source communication node, a plurality of data packets over the ad hoc network to a sink communication node during the full-duplex data transmission employing the computed frequency channel assignments for the full-duplex data transmission, wherein, for each the plurality of additional communication nodes, the distribution of the plurality of data packets involves simultaneously receiving one of the plurality of data packets on a first frequency channel and transmitting another one of the plurality of data packets on a second frequency channel.

14. The method of claim 13, further comprising computing a full-duplex frequency channel assignment autonomously based on a hop number of the broadcast packet.

15. The method of claim 13, wherein the broadcast packet includes a current hop number for the broadcast packet, the method further comprising assigning an upstream and a downstream frequency channel based on the current hop number and a number of available frequency channels for the full-duplex data transmission.

16. The method of claim 13, further comprising receiving packets from the additional communication nodes with respective position attributes of the additional communication nodes.

* * * * *